(12) United States Patent
Yeandel

(10) Patent No.: US 11,719,112 B2
(45) Date of Patent: Aug. 8, 2023

(54) TUBE GALLERY FOR GAS TURBINE ENGINE

(71) Applicant: ROLLS-ROYCE plc, London (GB)

(72) Inventor: Michael Yeandel, Bristol (GB)

(73) Assignee: Rolls-Royce plc, London (GB)

( * ) Notice: Subject to any disclaimer, the term of this patent is extended or adjusted under 35 U.S.C. 154(b) by 17 days.

(21) Appl. No.: 17/814,021

(22) Filed: Jul. 21, 2022

(65) Prior Publication Data
US 2023/0046941 A1 Feb. 16, 2023

(30) Foreign Application Priority Data
Aug. 11, 2021 (GB) ........................................ 2111518

(51) Int. Cl.
*F02C 7/32* (2006.01)
*F01D 9/06* (2006.01)

(52) U.S. Cl.
CPC ... *F01D 9/06* (2013.01); *F02C 7/32* (2013.01); *F05D 2250/11* (2013.01); *F05D 2250/12* (2013.01); *F05D 2260/60* (2013.01)

(58) Field of Classification Search
CPC ....... F02C 7/00; F02C 7/20; F02C 7/32; F02C 7/36; F01D 9/065; F01D 25/24; F01D 25/243; F05D 2260/60
See application file for complete search history.

(56) References Cited

U.S. PATENT DOCUMENTS

| 4,288,988 | A | 9/1981 | Curtil |
| 10,280,840 | B2 | 5/2019 | Meyst et al. |
| 2015/0377064 | A1 | 12/2015 | Celaya et al. |
| 2019/0211694 | A1* | 7/2019 | Huppe et al. ........... F01D 25/12 |
| 2019/0309948 | A1* | 10/2019 | Prociw et al. ........... F02C 7/20 |
| 2019/0360404 | A1* | 11/2019 | Staudte ................... F02C 9/18 |
| 2021/0079812 | A1* | 3/2021 | Troughton et al. ..... F02C 7/222 |

FOREIGN PATENT DOCUMENTS

| DE | 102006062373 A1 | 6/2008 |
| GB | 2572762 A | 10/2019 |
| KR | 20050008919 A | 1/2005 |

OTHER PUBLICATIONS

European search report dated Oct. 14, 2022, issued in EP Patent Application No. 22184455.
Great Britian search report dated Jan. 18, 2022, issued in GB Patent Application No. 2111518.3.

* cited by examiner

*Primary Examiner* — Eldon T Brockman
*Assistant Examiner* — Maxime M Adjagbe
(74) *Attorney, Agent, or Firm* — Barnes & Thornburg LLP

(57) ABSTRACT

A tube gallery for a gas turbine engine includes a body. The body includes an external surface. The body also includes a plurality of channels defined in the body. Each channel includes an inlet disposed on the external surface, an outlet spaced apart from the inlet and disposed on the external surface, and a passage extending between and fluidly communicating the inlet to the outlet. The passage of each channel has a non-circular cross-sectional shape. The non-circular cross-sectional shape has a first maximum dimension along a first direction and a second maximum dimension along a second direction orthogonal to the first direction. The first maximum dimension is greater than the second maximum dimension by a factor of at least 1.2.

20 Claims, 22 Drawing Sheets

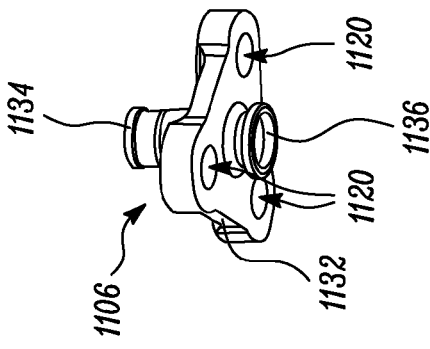
FIG. 11C
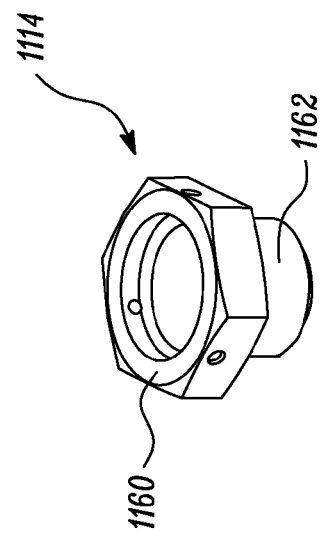
FIG. 11F
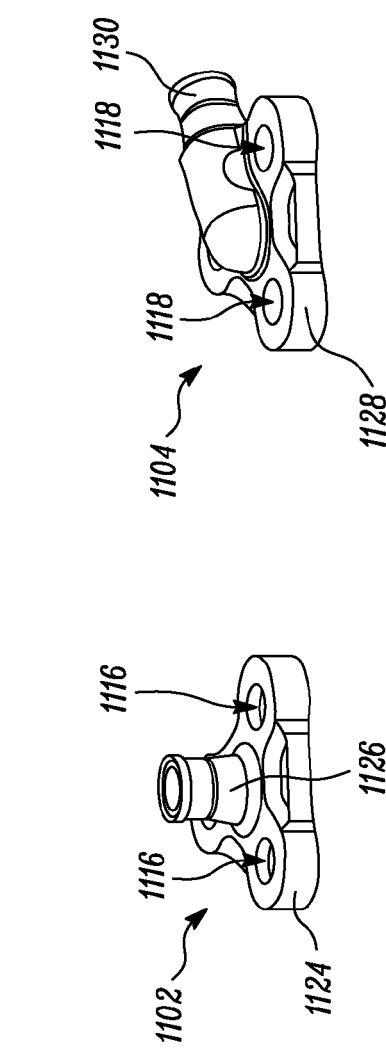
FIG. 11B
FIG. 11A
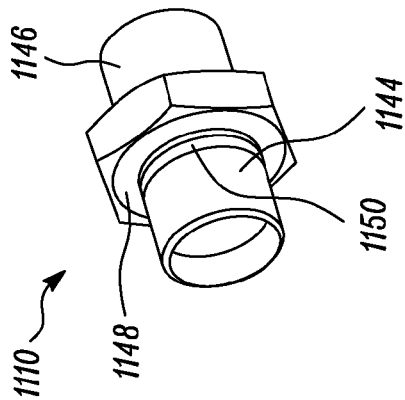
FIG. 11E
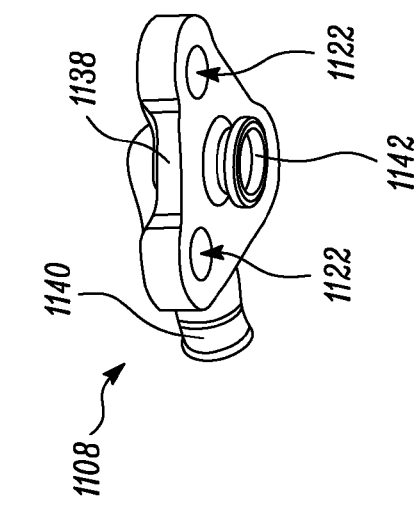
FIG. 11D

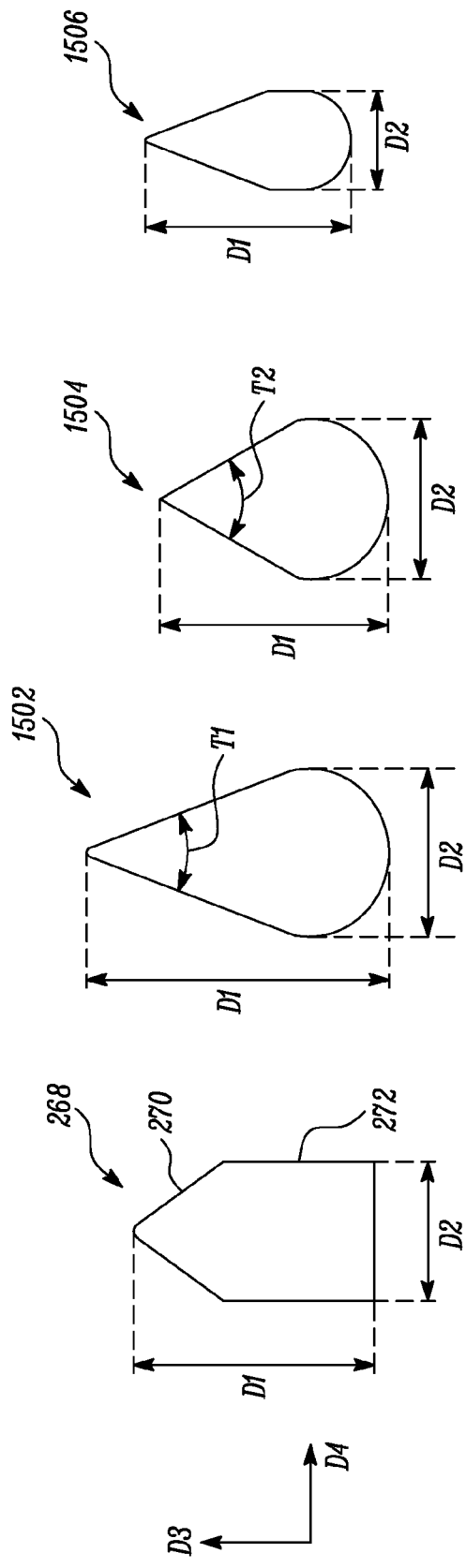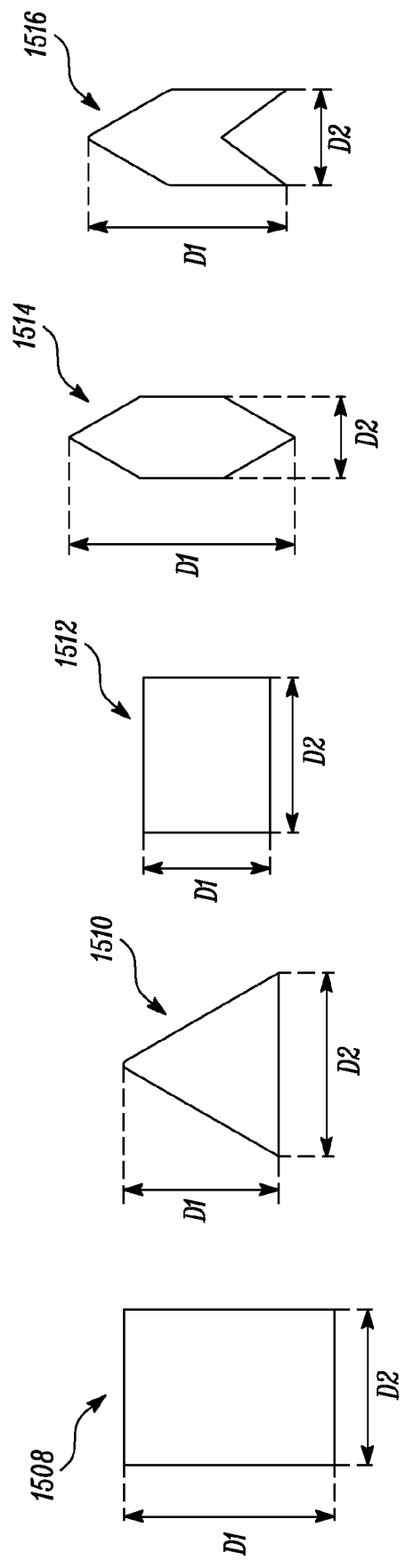

TUBE GALLERY FOR GAS TURBINE ENGINE

CROSS-REFERENCE TO RELATED APPLCATIONS

This application is based upon and claims the benefit of priority from British Patent Application GB 2111518.3, filed on Aug. 11, 2021, the entire contents of which are hereby incorporated by reference.

BACKGROUND

Technical Field

The present disclosure relates to a gas turbine engine, and in particular to a tube gallery for the gas turbine engine.

Description of Related Art

A tube gallery is associated with a gas turbine engine for establishing fluid communication between two or more components of the gas turbine engine. Such tube galleries may be accommodated in confined spaces when it is required to have fluid communication between two components of the gas turbine engine that are mounted close to each other.

Currently, tube galleries are manufactured by drilling passages through a side surface of a plate of the tube gallery. The drilled passages may facilitate fluid transfer between different components of the gas turbine engine. Such conventional tube galleries typically include straight passages having a circular cross-section as the passages of the tube gallery are created by drilling operations. Further, as the passages typically include the circular cross-section, a height of the tube gallery may be governed by passages having a highest diameter. Moreover, as the drilling operation are performed through the side surface of the tube gallery, fluid stagnation zones may be created in the passages proximate to the side surfaces. Such fluid stagnation zones may lead to undesirable fluid accumulation within the passages. Further, side holes created during the drilling operations may have to be blanked using a blanking plug as they are not functionally required, thereby increasing an additional manufacturing step.

Conventional tube galleries may also exhibit a high-pressure loss. Specifically, pressure losses may occur at one or more sharp bends where the drilled passages intersect each other. Further, conventional tube galleries typically tend to be heavy as the passages may not be optimally arranged. As the passages are not arranged in an optimal manner, it may be challenging to remove material from the body of the tube gallery, which may also increase material usage for a particular tube gallery.

SUMMARY

In a first aspect, there is provided a tube gallery for a gas turbine engine. The tube gallery includes a body formed as a single integral component. The body defines mutually orthogonal first, second, and third axes. The first and second axes define a first plane, the second and third axes define a second plane orthogonal to the first plane, and the first and third axes define a third plane orthogonal to each of the first and second planes. The body includes an external surface including an upper surface, a lower surface opposite to the upper surface, and a side surface extending between the upper surface and the lower surface. The upper surface and the lower surface substantially extend along the first and second axes. The side surface substantially extends along the third axis. The body also includes a plurality of channels defined in the body. Each channel includes an inlet disposed on the external surface, an outlet spaced apart from the inlet and disposed on the external surface, and a passage extending between and fluidly communicating the inlet to the outlet. The inlets of the plurality of channels are spaced apart from each other. The outlets of the plurality of channels are spaced apart from each other. The passage of each channel from the plurality of channels has a non-circular cross-sectional shape in one of the first, second, and third planes. The non-circular cross-sectional shape has a first maximum dimension along a first direction and a second maximum dimension along a second direction orthogonal to the first direction. The first maximum dimension is greater than the second maximum dimension by a factor of at least 1.2.

The present disclosure provides the tube gallery for use with gas turbine engines. The passages in the tube gallery are arranged in a manner that may allow removal of material from the tube gallery, thereby providing the tube gallery having a reduced weight. More particularly, the passages of the tube gallery may be arranged in proximity to each other which may facilitate removal of material from the tube gallery. Further, the passages may include any non-circular cross-sectional shape. In various embodiments, the non-circular cross-sectional shape of the passages may be chosen based on a shape of the body of the tube gallery and/or other factors, such as desired dimensions of the body owing to space constraints. The non-circular cross-sectional shape may have a high aspect ratio and the non-circular cross-sectional shape may be selected such that the tube gallery may exhibit increased strength and rigidity. Furthermore, pressure losses in the tube gallery may be minimized as the passages of the tube gallery eliminate sharp bends at turn corners.

Moreover, the tube gallery may be manufactured using additive layer manufacturing techniques, such as three-dimensional printing, or other manufacturing techniques, such as moulding and/or casting methods. Specifically, the tube gallery may be manufactured using any manufacturing technique that may allow creation of passages having the non-circular cross-sectional shapes. Using these manufacturing techniques, the passages may be optimally arranged to allow reduction in weight based on removal of material from the tube gallery. Further, by virtue of the present disclosure, it may be possible to provide the passages directly between the inlets and the outlets, thereby eliminating fluid stagnation zones in the tube gallery.

In some embodiments, at least one of the inlet and the outlet of at least one channel from the plurality of channels is disposed on the upper surface.

In some embodiments, at least one of the inlet and the outlet of at least one channel from the plurality of channels is disposed on the lower surface.

In some embodiments, at least one of the inlet and the outlet of at least one channel from the plurality of channels is disposed on the side surface.

In some embodiments, the inlet of at least one channel from the plurality of channels has a circular cross-sectional shape or a non-circular cross-sectional shape.

In some embodiments, the outlet of at least one channel from the plurality of channels has a circular cross-sectional shape or a non-circular cross-sectional shape.

In some embodiments, at least one channel from the plurality of channels includes an inlet boss comprising the inlet extending to the passage. The inlet boss is inclined to or parallel to the passage of the at least one channel.

In some embodiments, at least one channel from the plurality of channels includes an outlet boss comprising the outlet extending to the passage. The outlet boss is inclined to or parallel to the passage of the at least one channel.

In some embodiments, the passage of at least one channel from the plurality of channels is at least one of straight, curved, or spiral.

In some embodiments, at least one channel from the plurality of channels includes a plurality of outlets. The passage of the at least one channel includes a common portion fluidly communicating with the inlet and a plurality of branched portions branching from the common portion and fluidly communicating with a corresponding outlet from the plurality of outlets.

In some embodiments, the non-circular cross-sectional shape is at least one of rectangular, triangular, and square.

In some embodiments, the non-circular cross-sectional shape is a teardrop shape.

In some embodiments, the non-circular cross-sectional shape includes a rectangular portion and a triangular portion disposed adjacent to the rectangular portion.

In some embodiments, the body further includes an inlet flange disposed around the inlet of at least one channel from the plurality of channels. The inlet flange defines a plurality of apertures extending at least partially therethrough. The inlet flange may be used for coupling one or more fluid fittings or connectors to the body.

In some embodiments, the body includes one or more ribs extending from the inlet to the inlet flange. The ribs may have a strengthening function.

In some embodiments, the body includes a stiffening member disposed at least partially around a perimeter of the body. The stiffening member extends substantially along the third axis.

In some embodiments, the passages of at least two adjacent channels from the plurality of channels are spaced apart from each other along at least one of the first axis, the second axis, and the third axis.

In some embodiments, the passage of at least one channel from the plurality of channels is at least partially curved around the passage of another channel from the plurality of channels. Such an arrangement may allow optimal utilization of space within the body.

In some embodiments, the passages of at least two channels from the plurality of channels have different non-circular cross-sectional shapes.

In some embodiments, at least a portion of the passage of at least one channel from the plurality of channels is inclined obliquely relative to at least one of the first, second, and third planes.

As noted elsewhere herein, the present disclosure may relate to the gas turbine engine. Such a gas turbine engine may comprise an engine core including a turbine, a combustor, a compressor, and a core shaft connecting the turbine to the compressor. Such a gas turbine engine may include a fan (having fan blades) located upstream of the engine core.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

Embodiments will now be described by way of example only, with reference to the Figures, in which:

FIGS. 11A to 11F illustrate perspective views of different fittings that can be coupled with the tube gallery of FIG. 3;

FIGS. 15A to 15I illustrate schematic views of different non-circular cross-section shapes that may be associated with the passages of the tube gallery of FIG. 3;

DETAILED DESCRIPTION

Aspects and embodiments of the present disclosure will now be discussed with reference to the accompanying Figures. Further aspects and embodiments will be apparent to those skilled in the art.

Figure 1:
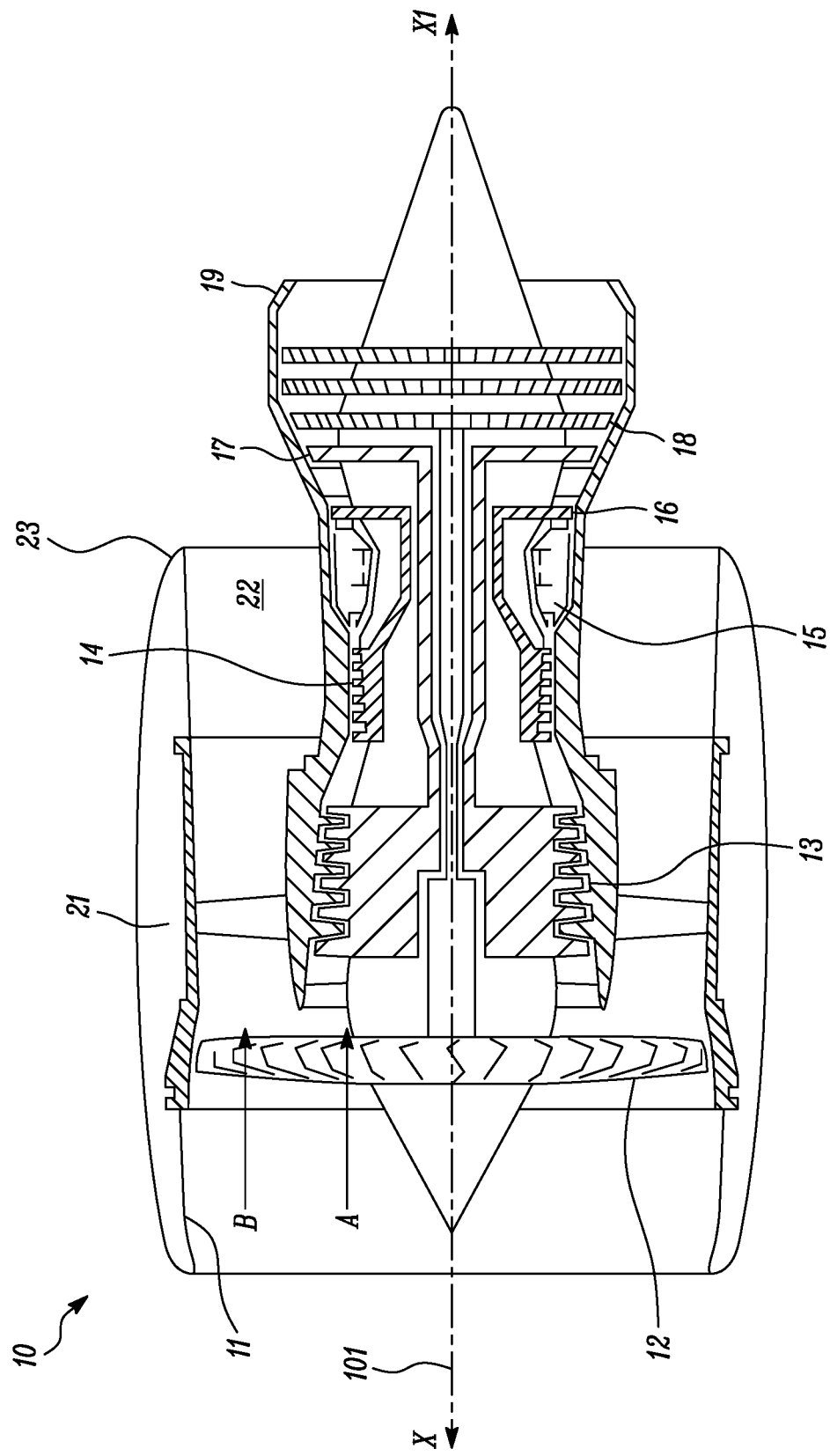
FIG. 1 is a sectional side view of a gas turbine engine.

FIG. 1 shows an exemplary gas turbine engine 10 having a principal rotational axis X-X1. The principal rotational axis X-X1 coincides with a longitudinal centre line 101 of the gas turbine engine 10.

In the following disclosure, the following definitions are adopted. The terms "upstream" and "downstream" are considered to be relative to an air flow through the gas turbine engine 10. The terms "axial" and "axially" are considered to relate to the direction of the principal rotational axis X-X1 of the gas turbine engine 10.

The gas turbine engine 10 includes, in axial flow series, an intake 11, a fan 12, an intermediate pressure compressor 13, a high-pressure compressor 14, a combustion equipment 15, a high-pressure turbine 16, an intermediate pressure turbine 17, a low-pressure turbine 18, and an engine core exhaust nozzle 19. A nacelle 21 generally surrounds the gas turbine engine 10 and defines the intake 11, a bypass duct 22, and a bypass exhaust nozzle 23. The gas turbine engine 10 also includes a tube gallery 200 (shown in FIGS. 2, 3, and 4) to transfer one or more fluids between one or more components 100, 102 (shown in FIG. 2) associated with the gas turbine engine 10.

During operation, air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the first air flow A directed into it before delivering that air to the high-pressure compressor 14 where further compression takes place.

The compressed air exhausted from the high-pressure compressor 14 is directed into the combustion equipment 15 where it is mixed with fuel and the mixture is combusted. The resultant hot combustion products then expand through, and thereby drive the high, intermediate, and low-pressure turbines 16, 17, 18 before being exhausted through the engine core exhaust nozzle 19 to provide additional propulsive thrust. The high, intermediate, and low-pressure turbines 16, 17, 18 respectively drive the high and intermediate pressure compressors 14, 13 and the fan 12 by suitable interconnecting shafts.

In some embodiments, the gas turbine engine 10 may be used in an aircraft (not shown). In some embodiments, the gas turbine engine 10 may be an ultrahigh bypass ratio (UHBPR) engine. It should be noted that the gas turbine engine 10 may include any other application, without limiting the scope of the present disclosure.

Figure 2:
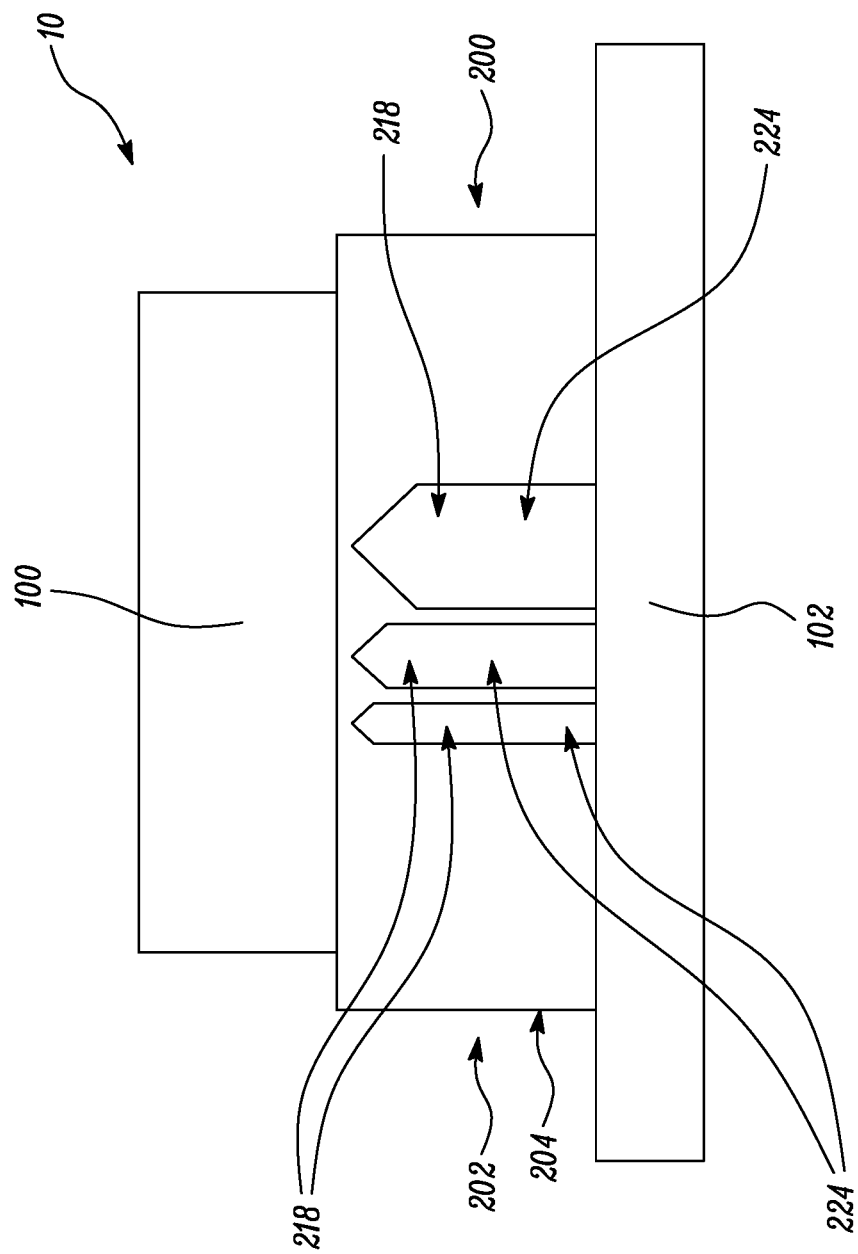
FIG. 2 is a schematic sectional view of a tube gallery disposed between two components of the gas turbine engine.

FIG. 2 shows a schematic view of the gas turbine engine 10 including the tube gallery 200. As illustrated in FIG. 2, the tube gallery 200 is disposed between the first component 100 and the second component 102. In some examples, the tube gallery 200 may be disposed adjacent to an accessory gearbox (not shown) of the gas turbine engine 10. Further, the first and second components 100, 102 may include any component associated with the gas turbine engine 10 between which fluid communication needs to be established. In some examples, one of the first and second components 100, 102 may embody a tank that stores fluids. In various embodiments, the tube gallery 200 may be used for transferring cooling fluids such as a coolants or air, fuels, lubrication fluids, hydraulic fluids, and the like, without any limitations.

The tube gallery 200 of the present disclosure may be manufactured using a casting technique, a moulding technique, an additive layer manufacturing technique such as a three-dimensional printing technique, and the like. Further, the tube gallery 200 may be manufactured using materials such as metals, plastics, resins, carbon fibres, or combinations thereof. It should be noted that the tube gallery 200 may be manufactured using any other manufacturing technique and/or material, without limiting the scope of the present disclosure.

Figure 3:
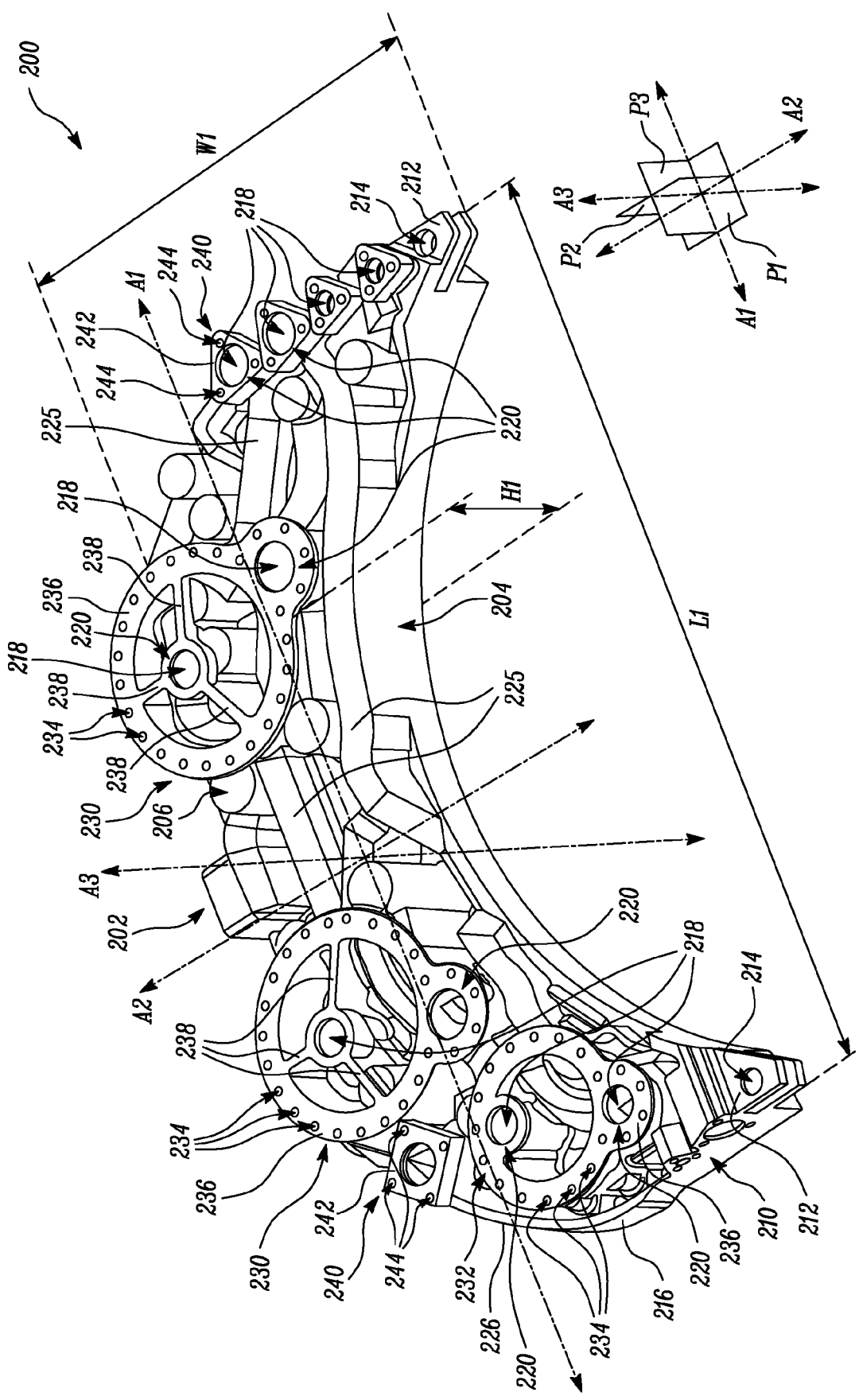
FIG. 3 is a front perspective view of the tube gallery associated with the gas turbine engine of FIG. 1.

FIG. 3 shows a front perspective view of the tube gallery 200. The tube gallery 200 includes a body 202 formed as a single integral component. The body 202 is generally crescent in shape. However, the body 202 of the tube gallery 200 may include any other shape, as per application requirements. In various embodiments, the shape of the tube gallery 200 may be governed by a geometry of the first and second components 100, 102 (see FIG. 2) and/or space between the first and second components 100, 102.

Further, the body 202 defines mutually orthogonal first, second, and third axes A1, A2, A3. A length L1 of the body 202 is defined along the first axis A1. Further, a width W1 of the body 202 is defined along the second axis A2. Moreover, a height H1 of the body 202 is defined along the third axis A3. It should be noted that the length L1, the width W1, and the height H1 may vary based on dimensions of the first and second components 100, 102, space between the first and second components 100, 102, and the like. Further, the first and second axes A1, A2 define a first plane P1. Moreover, the second and third axes A2, A3 define a second plane P2 orthogonal to the first plane P1. Additionally, the first and third axes A1, A3 define a third plane P3 orthogonal to each of the first and second planes P1, P2.

Figure 6:
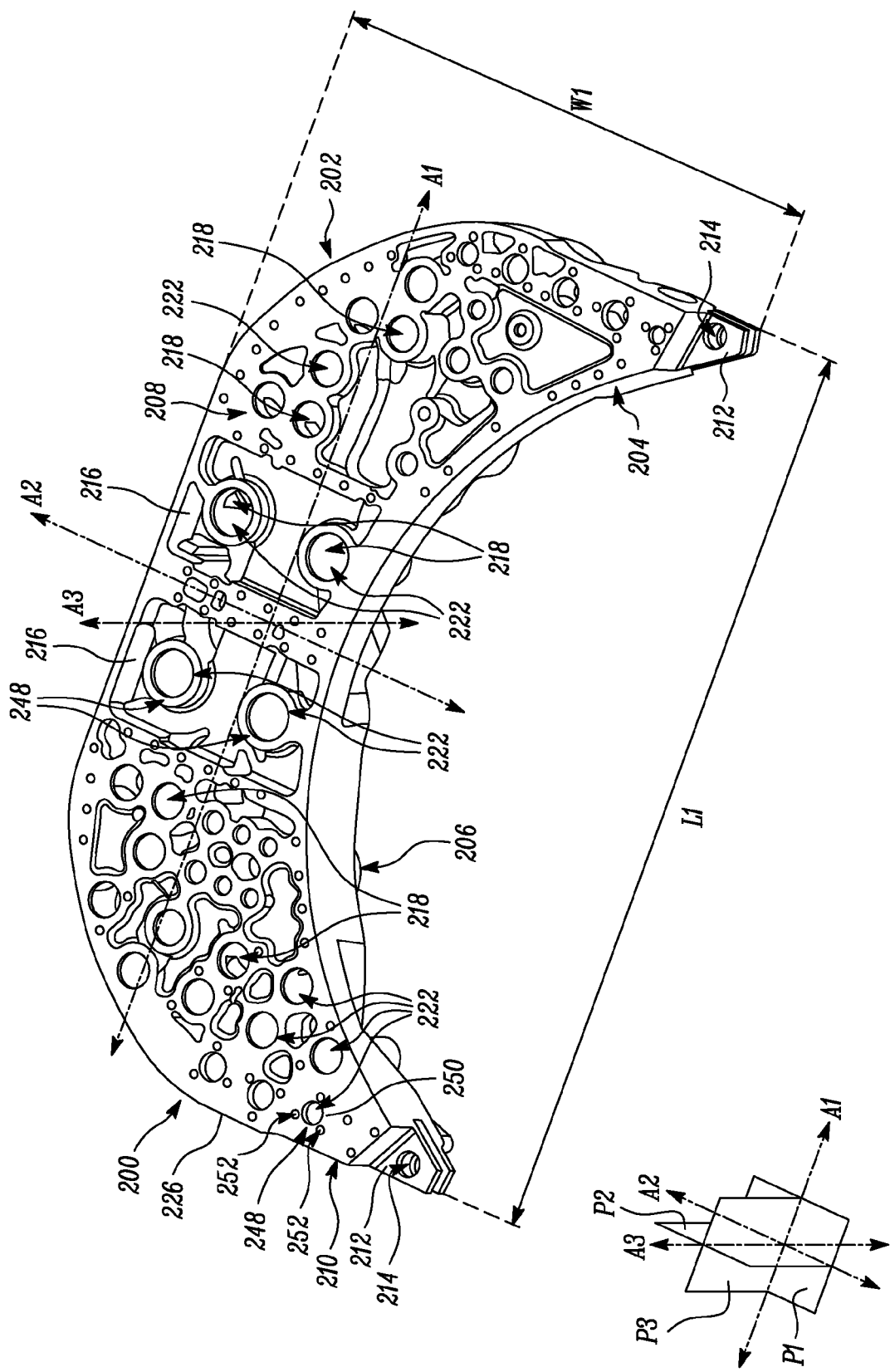
FIG. 6 is a rear perspective view of the tube gallery of FIG. 3.

In the illustrated embodiment of FIG. 3, the body 202 includes an external surface 204. The external surface 204 includes an upper surface 206, a lower surface 208 (as shown in FIG. 6) opposite to the upper surface 206, and a side surface 210 extending between the upper surface 206 and the lower surface 208. In the illustrated embodiment of FIG. 3, the upper surface 206 and the lower surface 208 substantially extend along the first and second axes A1, A2. In the illustrated embodiment of FIG. 3, the side surface 210 substantially extends along the third axis A3.

In the illustrated embodiment of FIG. 3, each of the upper surface 206 and the side surface 210 define a substantially non-planar profile whereas the lower surface 208 defines a substantially planar profile. The upper surface 206, the lower surface 208, and the side surface 210 may include various curved portions, planar portions, protrusions, openings (such as holes, apertures, or cavities), grooves, or a combination thereof. The body 202 also includes one or more mounting brackets 212 to mount the tube gallery 200 between the first component 100 (see FIG. 2) and the second component 102 (see FIG. 2). In the illustrated embodiment of FIG. 3, the body 202 includes two mounting brackets 212 disposed at either ends of the body 202. In other embodiments, the body 202 may include any number of the mounting brackets 212 or other mounting features, without limiting the scope of the present disclosure. The mounting brackets 212 may include one or more holes 214 to receive mechanical fasteners (not shown) for mounting of the tube gallery 200. In the illustrated embodiment of FIG. 3, each mounting bracket 212 includes two holes 214 that are in alignment with each other with respect to the second and third axes A2, A3.

In the illustrated embodiment of FIG. 3, the body 202 includes a stiffening member 216 disposed at least partially around a perimeter 226 of the body 202. The stiffening member 216 may extend substantially along the third axis A3. The stiffening member 216 is embodied as a generally curved plate. In the illustrated embodiment of FIG. 3, the body 202 includes two stiffening members 216 extending along the perimeter 226 of the body 202 between the two mounting brackets 212. In some examples, the body 202 may include a single stiffening member extending between the two mounting brackets 212. In various embodiments, the body 202 may include any number of the stiffening members 216, as per application requirements. The stiffening members 216 may improve strength, stiffness, and form of the tube gallery 200. Further, the stiffening members 216 may support loads exerted on the tube gallery 200 by one or more components of the gas turbine engine 10.

Figure 4:
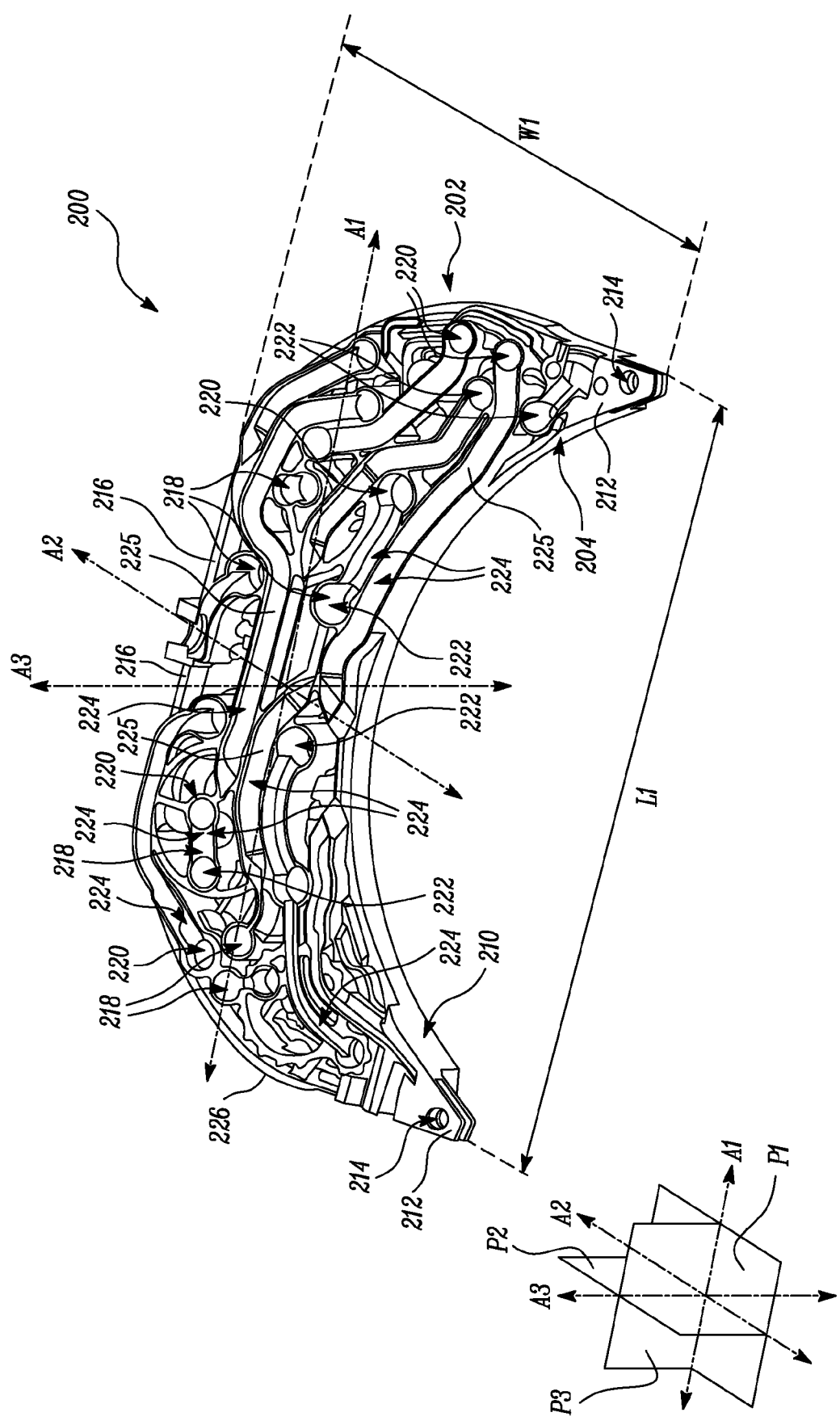
FIG. 4 is a cross-sectional view of the tube gallery of FIG. 3 along a first plane P1.
Figure 5:
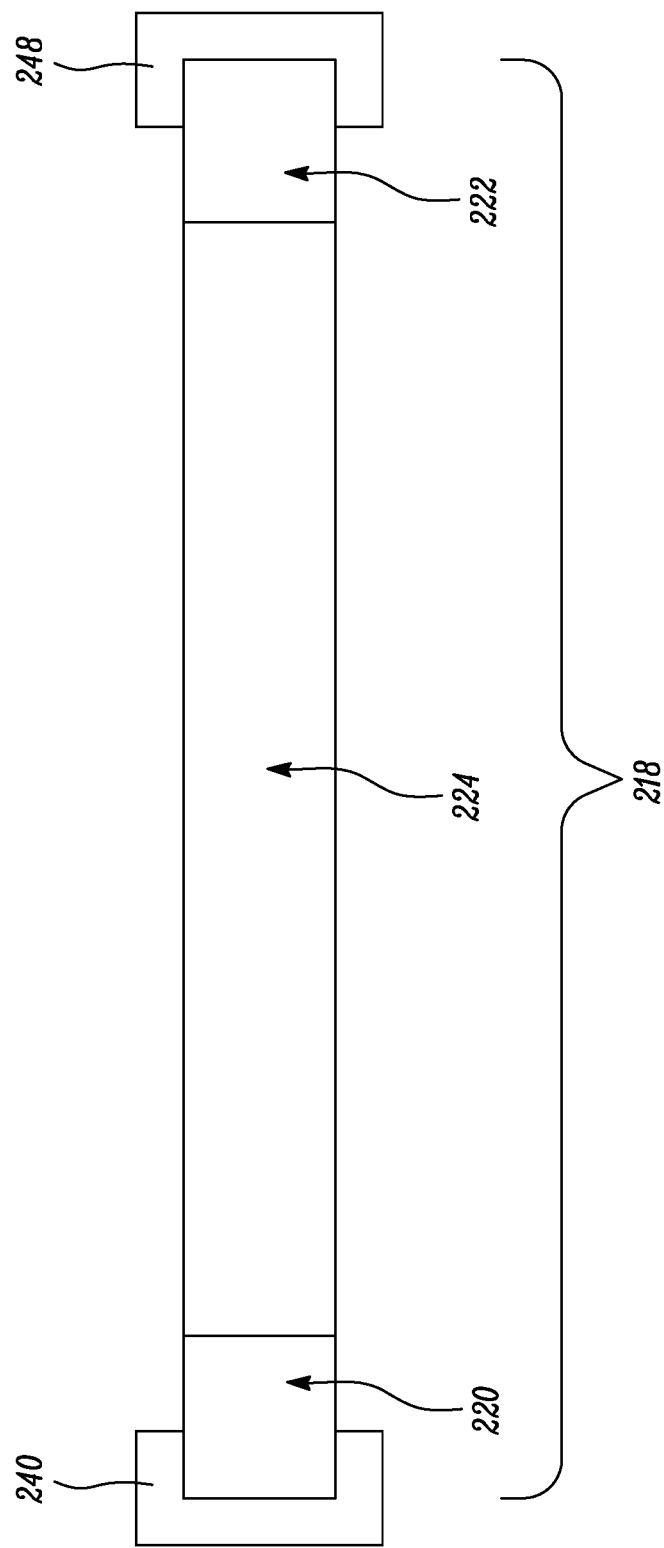
FIG. 5 is a schematic side view of a channel associated with the tube gallery of FIG. 3.

The body 202 further includes a plurality of channels 218 defined in the body 202. As illustrated in FIGS. 4 and 5, each channel 218 includes an inlet 220 disposed on the external surface 204 (see FIG. 4), an outlet 222 spaced apart from the inlet 220 and disposed on the external surface 204, and a passage 224 extending between and fluidly communicating the inlet 220 to the outlet 222. The inlet 218 and the outlet 222 may be spaced apart from each other along any one of the first, second, and third axes A1, A2, A3 (see FIG. 3). Moreover, each passage 224 defines a passage wall 225 (shown in FIGS. 3 and 4). In some examples, the passage wall 225 may form a portion of the upper surface 206 (see FIG. 3), the lower surface 208, or the side surface 210 based on a positioning of the passage 224.

Figure 7:
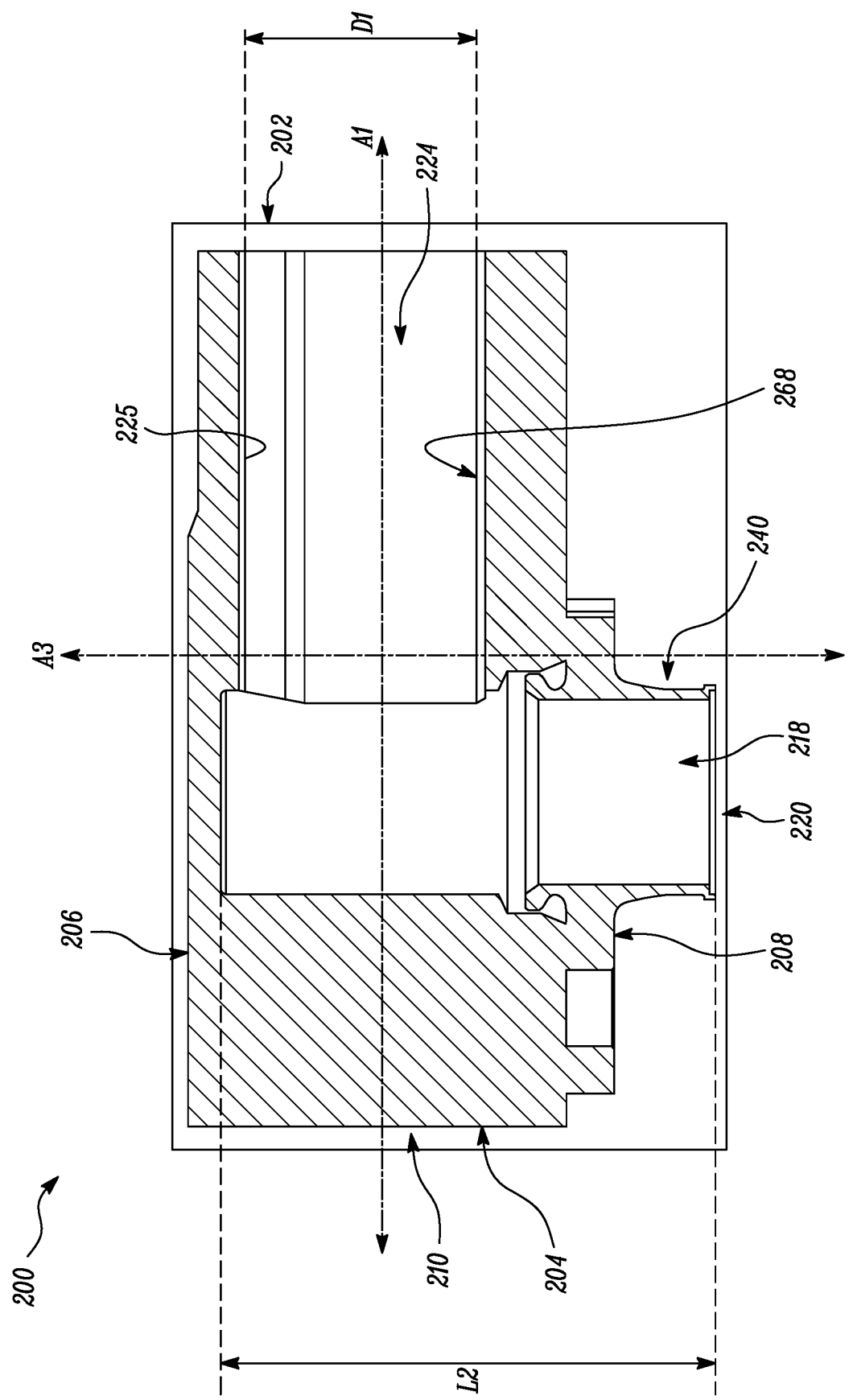
FIG. 7 is a schematic sectional view of a portion of the tube gallery of FIG. 3 illustrating an inlet of the channel disposed at a lower surface of the tube gallery.

Further, the inlet 220 receives fluids and directs the fluids towards the passage 224. The inlets 220 of the plurality of channels 218 are spaced apart from each other. The inlets 220 may be spaced apart from each other along the first and second axes A1, A2 (as illustrated in FIG. 3). In other embodiments, the inlets 220 may be spaced apart from each other along the third axis A3. Further, the inlet 220 of at least one channel 218 from the plurality of channels 218 may have a circular cross-sectional shape or a non-circular cross-sectional shape. The inlets 220 illustrated in FIG. 3 have a circular cross-sectional shape. The inlet 220 may extend along a length L2 (shown in FIG. 7). Further, the inlet 220 having the circular cross-sectional shape is in fluid communication with the passage 224 having a non-circular cross-sectional shape 268 (as illustrated in FIG. 7). Moreover, the inlet 220 may have the non-circular cross-sectional shape if the inlet 220 seals with a face seal. In some examples, the shape of the inlets 220 may correspond to the non-circular cross-sectional shape 268 of the passage 224.

Figure 9:
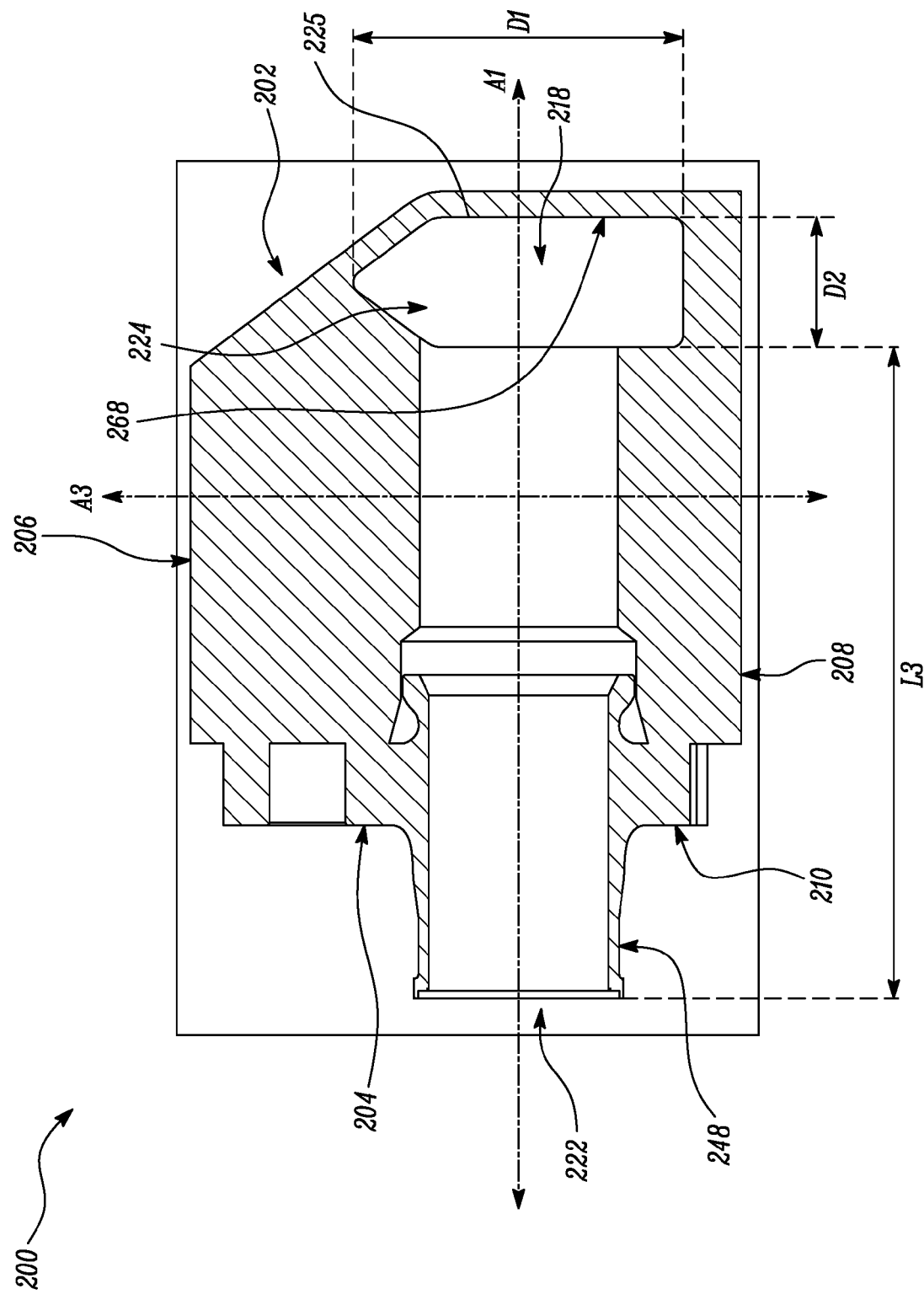
FIG. 9 is a schematic sectional view of the tube gallery of FIG. 3 illustrating an outlet of the channel disposed at the side surface of the tube gallery.

As shown in FIG. 6, the outlet 222 receives the fluid from the passage 224 (see FIGS. 4 and 5) and directs the fluid to the component 100 or 102 (see FIG. 2) disposed adjacent to the tube gallery 200. As shown in FIG. 6, the outlets 222 of the plurality of channels 218 are spaced apart from each other. In the illustrated embodiment of FIG. 6, the outlets 222 are spaced apart from each other along the first and second axes A1, A2. In other embodiments, the outlets 222 may be spaced apart from each other along the third axis A3. Further, the outlet 222 of at least one channel 218 from the plurality of channels 218 may have a circular cross-sectional shape or a non-circular cross-sectional shape. In illustrated embodiment of FIG. 6, the outlets 222 have a circular cross-sectional shape. The outlet 222 may extend along a length L3 (shown in FIG. 9). Further, the outlet 222 having the circular cross-sectional shape is in fluid communication with the passage 224 having the non-circular cross-sectional shape 268 (as illustrated in FIG. 9). Moreover, the outlet 222 may have the non-circular cross-sectional shape if the outlet 222 seals with a face seal. In some examples, the shape of the outlets 222 may correspond to the non-circular cross-sectional shape 268 of the passage 224.

Referring to FIGS. 3, 6, and 7, at least one of the inlet 220 (see FIGS. 3 and 7) and the outlet 222 (see FIG. 6) of at least one channel 218 from the plurality of channels 218 may be disposed on the upper surface 206. Some of the inlets 220 that are disposed on the upper surface 206 are illustrated in FIG. 3. In another exemplary embodiment, the outlets 222 may be disposed on the upper surface 206, without any limitations. Further, at least one of the inlet 220 and the outlet 222 of at least one channel 218 from the plurality of channels 218 may be disposed on the lower surface 208. For example, as illustrated in FIG. 6, the outlets 222 may be disposed on the lower surface 208. In another example, as illustrated in FIG. 7, the inlets 220 may be disposed on the lower surface 208.

Figure 8:
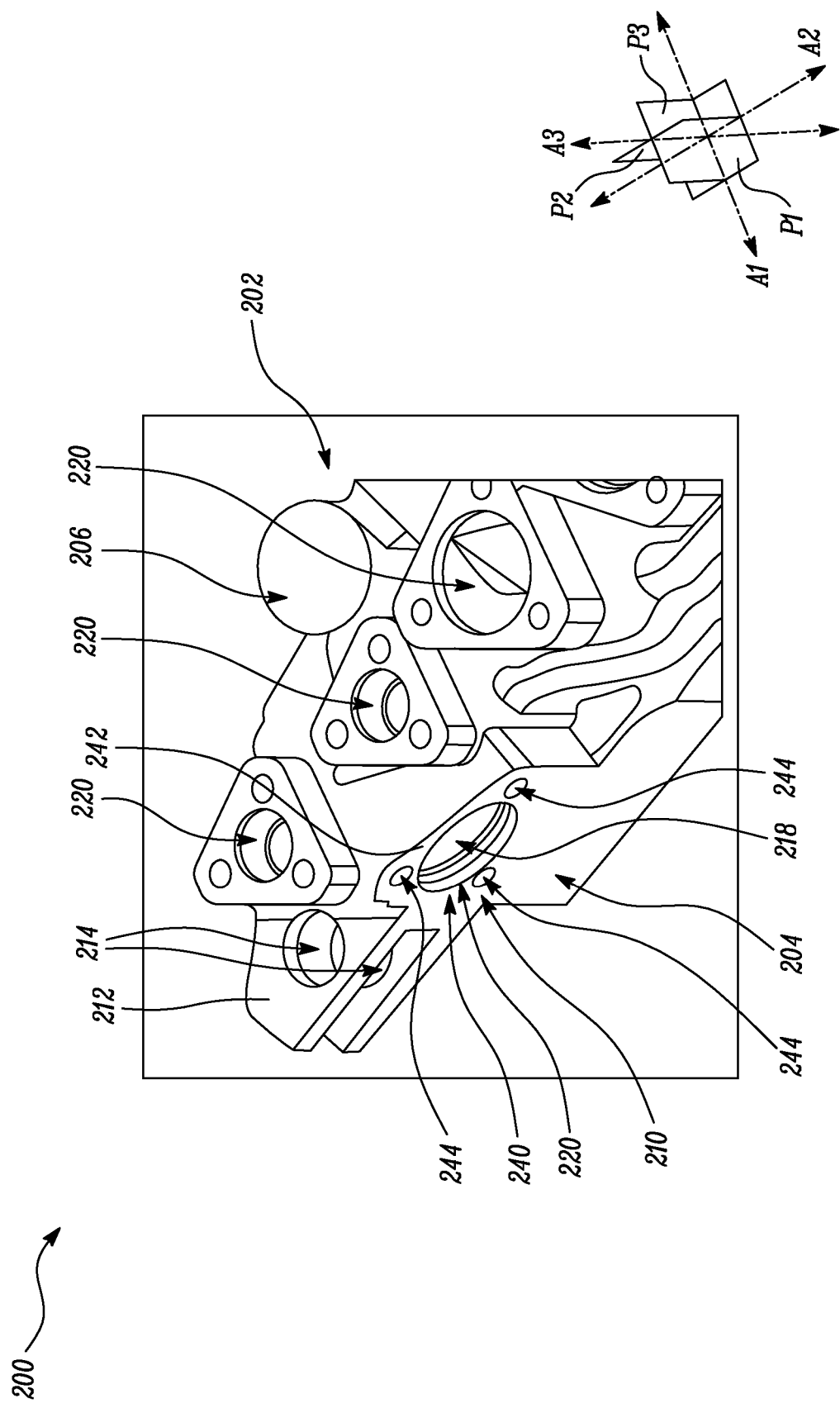
FIG. 8 is a perspective view of a portion of the tube gallery of FIG. 3 illustrating an inlet of the channel disposed at a side surface of the tube gallery.

Referring now to FIGS. 8 and 9, at least one of the inlet 220 (see FIG. 8) and the outlet 222 (see FIG. 9) of at least one channel 218 from the plurality of channels 218 may be disposed on the side surface 210. For example, the inlet 220 may be disposed on the side surface 210 as illustrated in FIG. 8. In another example, the outlet 222 may be disposed on the side surface 210 as illustrated in FIG. 9. It should be noted that a position of the inlets 220 and a position of the outlets 222 may vary based on positioning of the first and second components 100, 102 (see FIG. 2), space constraints, a location from which the fluid is being received within the inlets 220, a location to which the fluid needs to be delivered by the outlets 222, and the like.

Figure 10:
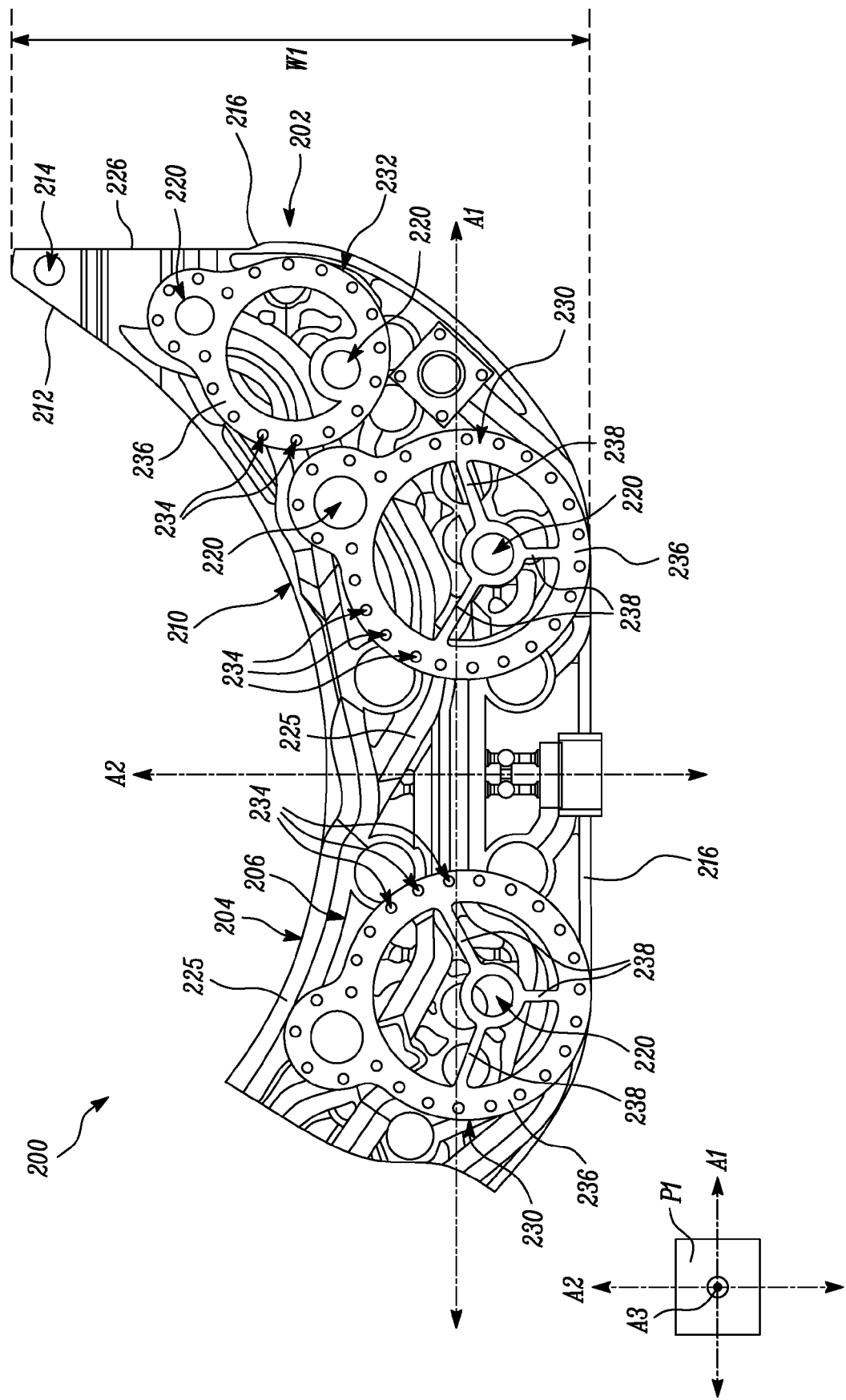
FIG. 10 is a top view of the tube gallery of FIG. 3.

Referring now to FIG. 10, the body 202 further includes an inlet flange 230, 232 disposed around the inlet 220 of at least one channel 218 from the plurality of channels 218. FIG. 10 illustrates two different designs for the inlet flange 230, 232. The inlet flanges 230, 232 may align with the inlet 220 of the channels 218 for introduction of fluids within the passages 224 (see FIGS. 4 and 5) of the channels 218. The inlet flange 230, 232 may also allow coupling of the inlet 220 of the channel 218 with outer fittings (not shown) of the components 100, 102 (see FIG. 2) to which the tube gallery 200 is coupled. The inlet flange 230, 232 may define a plurality of apertures 234 extending at least partially therethrough. In some embodiments, the apertures 134 may be embodied as through-apertures. The apertures 234 may be disposed circumferentially around a rim 236 of the inlet flange 230, 232. Further, the inlet flange 230, 232 and the outer fitting of the component 100, 102 may be coupled using mechanical fasteners (not shown), such as bolts, screws, and the like. The body 202 may include one or more ribs 238 extending from the inlet 220 to the inlet flange 230. More particularly, in the illustrated embodiment of FIG. 10, the flanges 230 include three ribs 238 extending from the inlet 220 to the inlet flange 230. The ribs 238 may provide strength and rigidity to the inlet flange 230. In some embodiments, the ribs 238 may be an integral part of the inlet flange 230. In another embodiment, the inlet flange 232 may also include ribs (similar to the ribs 238). In other embodiments, the outlets 222 may include one or more outlet flanges similar to the inlet flanges 230, 232.

Referring now to FIGS. 3, 7, and 8, at least one channel 218 from the plurality of channels 218 may include an inlet boss 240 including the inlet 220 extending to the passage 224 (see FIGS. 4 and 5). The inlet boss 240 may be integral with the body 202. The inlet boss 240 may be defined around the inlet 220 to allow coupling of one of more fittings 1102, 1104, 1106, 1108, 1110, 1114 (shown in FIGS. 11A to 11F) with the body 202. The inlet boss 240 may define a mounting surface 242 (see FIGS. 3 and 8). The mounting surface 242 may define one or more first apertures 244 (see FIGS. 3 and 8) that may align with through-holes 1116, 1118, 1120, 1122 (shown in FIGS. 11A to 11D) in the corresponding fitting 1102, 1104, 1106, 1108 for coupling of the corresponding fitting 1102, 1104, 1106, 1108 with the inlet boss 240. Further, the mounting surface 242 may have a circular cross-sectional shape, a triangular shape, a rectangular shape, an elliptical shape, and the like. In some examples, the mounting surface 242 may be flush with the upper surface 206, the lower surface 208 (see FIG. 6), or the side surface 210. As shown in FIG. 8, the mounting surface 242 is flush with the side surface 210. In other examples, the mounting surface 242 may be raised (as shown in FIG. 3)

with respect to other portions of the body 202. Further, the inlet boss 240 may define a number of threads that may allow coupling of the fitting 1102, 1104, 1106, 1108, 1110, 1114 with the inlet boss 240.

In some embodiments, the inlet boss 240 may be disposed on the lower surface 208 as the inlet 220 of the channel 218 is disposed on the lower surface 208 (as illustrated in FIG. 7). In other embodiments, the inlet boss 240 may be disposed on the upper surface 206 as the inlet 220 of the channel 218 is disposed on the upper surface 206 (as illustrated in FIG. 3). In yet another embodiment, the inlet boss 240 may be disposed on the side surface 210 as the inlet 220 of the channel 218 is disposed on the side surface 210 (as illustrated in FIG. 8).

Further, the inlet boss 240 may be inclined to or parallel to the passage 224 of the at least one channel 218. More particularly, as the passages 224 generally extend along the first, second, or third planes P1, P2, P3 and the inlet boss 240 may be coupled to the upper surface 206, the lower surface 208, or the side surface 210, the inlet boss 240 may be disposed such that inlet boss 240 may be inclined to or parallel to the passage 224. In some embodiments, the inlet boss 240 may be inclined to the passage 224 such that the inlet boss 240 is disposed at an angle of approximately 90 degrees relative to the passage 224 (as illustrated in FIG. 7). In various embodiments, one or more dimensions of the inlet boss 240 may be determined based on allowable dimensions of the body 202, type of the fittings 1102, 1104, 1106, 1108, 1110, 1114, and the like. In some examples, the inlet boss 240 may allow coupling of one of more bolted-on units (not shown) with the body 202. For example, the bolted-on units may embody the components 100, 102 (see FIG. 2), without any limitations.

Referring now to FIGS. 6 and 9, at least one channel 218 from the plurality of channels 218 may include an outlet boss 248 including the outlet 222 extending to the passage 224 (see FIG. 9). The outlet boss 248 may be integral with the body 202. The outlet boss 248 may be defined around the outlet 222 to allow coupling of one of more bolted-on units (not shown) with the body 202. For example, the bolted-on units may embody the components 100, 102 (see FIG. 2), without any limitations. The outlet boss 248 may define a mounting surface 250 (shown in FIG. 6). The mounting surface 250 may include one or more second apertures 252 (shown in FIG. 6) that align with through-holes (not shown) in a corresponding bolted-on unit for coupling of the corresponding bolted-on unit with the outlet boss 248. The mounting surface 250 may have a circular cross-sectional shape, a triangular shape, a rectangular shape, an elliptical shape, and the like. In some examples, the mounting surface 250 may be flush with the upper surface 206, the lower surface 208, or the side surface 210. In other examples, the mounting surface 250 may be raised with respect to other portions of the body 202. Further, in some examples, the outlet boss 248 may define a number of threads that may allow coupling of screw-type units or fittings with the outlet boss 248.

In some embodiments, the outlet boss 248 may be disposed on the lower surface 208 when the outlet 222 of the channel 218 is disposed on the lower surface 208 (as illustrated in FIG. 6). In other embodiments, the outlet boss 248 may be disposed on the upper surface 206 when the outlet 222 of the channel 218 is disposed on the upper surface 206. In yet another embodiment, the outlet boss 248 may be disposed on the side surface 210 when the outlet 222 of the channel 218 is disposed on the side surface 210 (as illustrated in FIG. 9).

Further, the outlet boss 248 may be inclined to or parallel to the passage 224 of the at least one channel 218. More particularly, as the passages 224 generally extend along the first, second, or third planes P1, P2, P3, and the outlet boss 248 may be coupled to the upper surface 206, the lower surface 208, or the side surface 210, the outlet boss 248 may be disposed such that the outlet boss 248 may be inclined to or parallel to the passage 224. For example, the outlet boss 248 is parallel to the passage 224 in FIG. 9. In some examples, the outlet boss 248 may be inclined to the passage 224 such that the outlet boss 248 is disposed at an angle of approximately 90 degrees relative to the passage 224. In various embodiments, one or more dimensions of the outlet boss 248 may be determined based on allowable dimensions of the body 202, type of the bolted-on units, and the like. It should be noted that the fittings 1102, 1104, 1106, 1108, 1110, 1114 (see FIGS. 11A to 11F) as well as the bolted-on units may allow ingress and exit of fluids from the tube gallery 200 depending on their positioning. Accordingly, in an embodiment, the fittings 1102, 1104, 1106, 1108, 1110, 1114 may be disposed at the inlet 220 (see FIG. 3) and the bolted-on units may be disposed at the outlet 222. Alternatively, it may be contemplated that the fittings 1102, 1104, 1106, 1108, 1110, 1114 may be disposed at the outlet 222 and the bolted-on units may be disposed at the inlet 220.

FIGS. 11A to 11F illustrate perspective views of different fittings 1102, 1104, 1106, 1108, 1110, 1114 that can be coupled to the inlet boss 240 (see FIGS. 3, 7, and 8). Specifically, FIGS. 11A to 11D describe bolted-type fittings and FIGS. 11E and 11F describe screw-type fittings. In some examples, the fittings 1102, 1104, 1106, 1108, 1110, 1114 can be coupled to the outlet boss 248 (see FIGS. 6 and 9), without any limitations. A shape and a size of the fittings 1102, 1104, 1106, 1108, 1110, 1114 may be selected such that it corresponds to a shape and a size of a corresponding inlet boss 240. It should be noted that sealing components, such as O-rings, beam seals, gaskets, and the like may be disposed between the fittings 1102, 1104, 1106, 1108, 1110, 1114 and the inlet boss 240 for a leak proof joint.

FIG. 11A illustrates the exemplary fitting 1102 embodied as a bolted fitting. As illustrated in FIG. 11A, a first portion 1124 of the fitting 1102 defines a generally triangular shaped structure. The first portion 1124 of the fitting 1102 defines three through-holes 1116 to receive the mechanical fasteners for coupling the fitting 1102 with the inlet boss 240 (see FIG. 3). The first portion 1124 of the fitting 1102 may define a cross-section similar to the cross-section shape of the inlet boss 240. Further, a second portion 1126 of the fitting 1102 extends vertically from the first portion 1124 such that the first portion 1124 and the second portion 1126 are in alignment with each other. The first and second portions 1124, 1126 define a circular cross-section herein. Alternatively, the first and second portions 1124, 1126 may define any other cross-section such as circular, square, rectangular, triangular, hexagonal, and the like.

FIG. 11B illustrates the exemplary fitting 1104 that is embodied as an elbow type of bolted fitting. As illustrated in FIG. 11B, a first portion 1128 of the fitting 1104 defines a generally triangular shaped structure. The first portion 1128 of the fitting 1104 defines three through-holes 1118 to receive the mechanical fasteners for coupling the fitting 1104 with the inlet boss 240 (see FIG. 3). The first portion 1128 of the fitting 1104 may define a cross-section similar to a cross-section of the inlet boss 240. Further, a second portion 1130 of the fitting 1104 extends from the first portion 1128. The first and second portions 1128, 1130 are substantially perpendicular to each other. The first and second portions 1128, 1130 define a circular cross-section herein. Alternatively, the first and second portions 1128, 1130 may define any other cross-section such as circular, square, rectangular, triangular, hexagonal, and the like.

FIG. 11C illustrates the exemplary fitting 1106 that is embodied as a bolted fitting with spigot. As illustrated in FIG. 11C, a first portion 1132 of the fitting 1106 defines a generally triangular shaped structure. Further, the fitting 1106 includes a spigot 1136 coupled to the first portion 1132. The first portion 1132 of the fitting 1106 defines three through-holes 1120 to receive the mechanical fasteners for coupling the fitting 1106 with the inlet boss 240 (see FIG. 3). The first portion 1132 of the fitting 1106 may define a cross-section similar to a cross-section of the inlet boss 240. Further, a second portion 1134 of the fitting 1106 extends vertically from the first portion 1132 such that the spigot 1136, the first portion 1132, and the second portion 1134 are in alignment with each other. The first and second portions 1132, 1134 and the spigot 1136 define a circular cross-section herein. Alternatively, the first and second portions 1132, 1134 and the spigot 1136 may define any other cross-section such as circular, square, rectangular, triangular, hexagonal, and the like.

FIG. 11D illustrates the exemplary fitting 1108 that is embodied as a bolted elbow fitting with spigot. As illustrated in FIG. 11D, a first portion 1138 of the fitting 1108 defines a generally triangular shaped structure. Further, the fitting 1108 includes a spigot 1142 coupled to the first portion 1138. The first portion 1138 of the fitting 1108 defines three through-holes 1122 to receive the mechanical fasteners for coupling the fitting 1108 with the inlet boss 240 (see FIG. 3). The first portion 1138 of the fitting 1108 may define a cross-section similar to a cross-section of the inlet boss 240. Further, a second portion 1140 projects from the first portion 1138. The first and second portions 1138, 1140 are substantially perpendicular to each other. The first and second portions 1138, 1140 and the spigot 1142 define a circular cross-section herein. Alternatively, the first and second portions 1138, 1140 and the spigot 1142 may define any other cross-section such as circular, square, rectangular, triangular, hexagonal, and the like.

FIG. 11E illustrates the exemplary fitting 1110 that is embodied as a double ended union fitting. As illustrated in FIG. 11E, a first portion 1144 of the fitting 1110 defines a cylindrical shaped structure with a hexagonal nut 1148. In other examples, the hexagonal nut 1148 may be replaced by a cylindrical nut. The first portion 1144 of the fitting 1110 may define a cross-section similar to a cross-section of the inlet boss 240 (see FIG. 3). The first portion 1144 of the fitting 1110 may define an engagement feature 1150. The engagement feature 1150 may allow coupling of the fitting 1110 with the inlet boss 240. Further, the hexagonal nut 1148 of the first portion 1144 may assist operators by providing a gripping surface during engagement and disengagement of the fitting 1110 with the inlet boss 240. Moreover, a second portion 1146 of the fitting 1110 is also embodied as a cylindrical shaped member that is in alignment with the first portion 1144. The first and second portions 1144, 1146 define a circular cross-section herein. Alternatively, the first and second portions 1144, 1146 may define any other cross-section such as circular, square, rectangular, triangular, hexagonal, and the like.

FIG. 11F illustrates the exemplary fitting 1114 that is embodied as an end stop fitting. The fitting 1114 may be used to close a particular inlet or outlet 220, 222 (see FIGS. 3 and 6) to prevent fluid transfer therethrough. As illustrated in FIG. 11F, the fitting 1114 includes a hexagonal nut 1160 and a cylindrical portion 1162 extending from the hexagonal nut 1160 that engages with the inlet boss 240 (see FIG. 3). The cylindrical portion 1162 of the fitting 1114 may define a cross-section similar to a cross-section of the inlet boss 240. The cylindrical portion 1162 defines a circular cross-section herein. Alternatively, the cylindrical portion 1162 may define any other cross-section such as circular, square, rectangular, triangular, hexagonal, and the like. It should be noted that the fittings 1102, 1104, 1106, 1108, 1110, 1114 described in relation to FIGS. 11A to 11F herein are exemplary in nature, and any other type of fitting may be coupled to the inlet boss 240, without any limitations.

Figure 12:
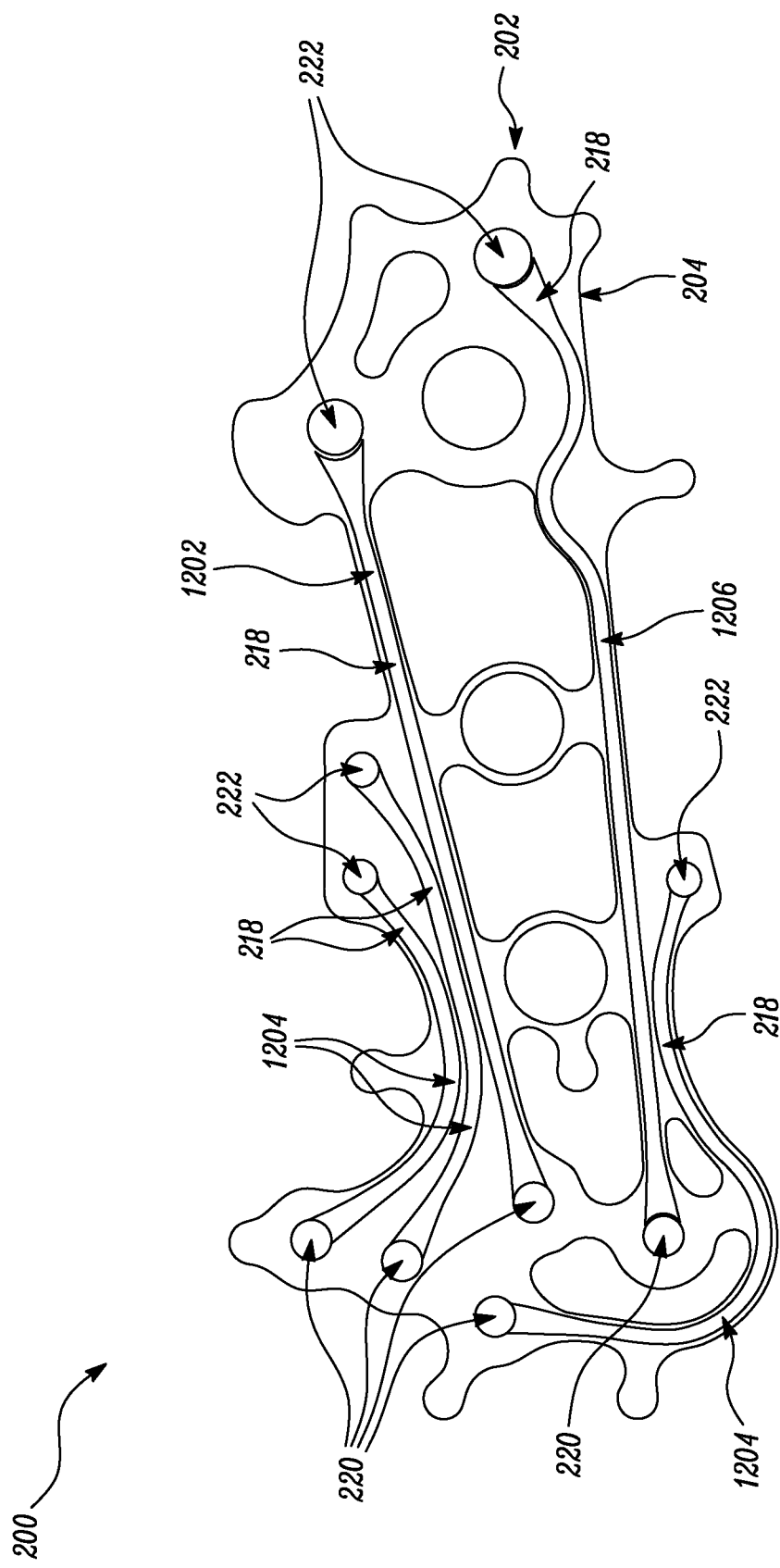
FIG. 12 is a schematic sectional view of the tube gallery of FIG. 3.
Figure 13:
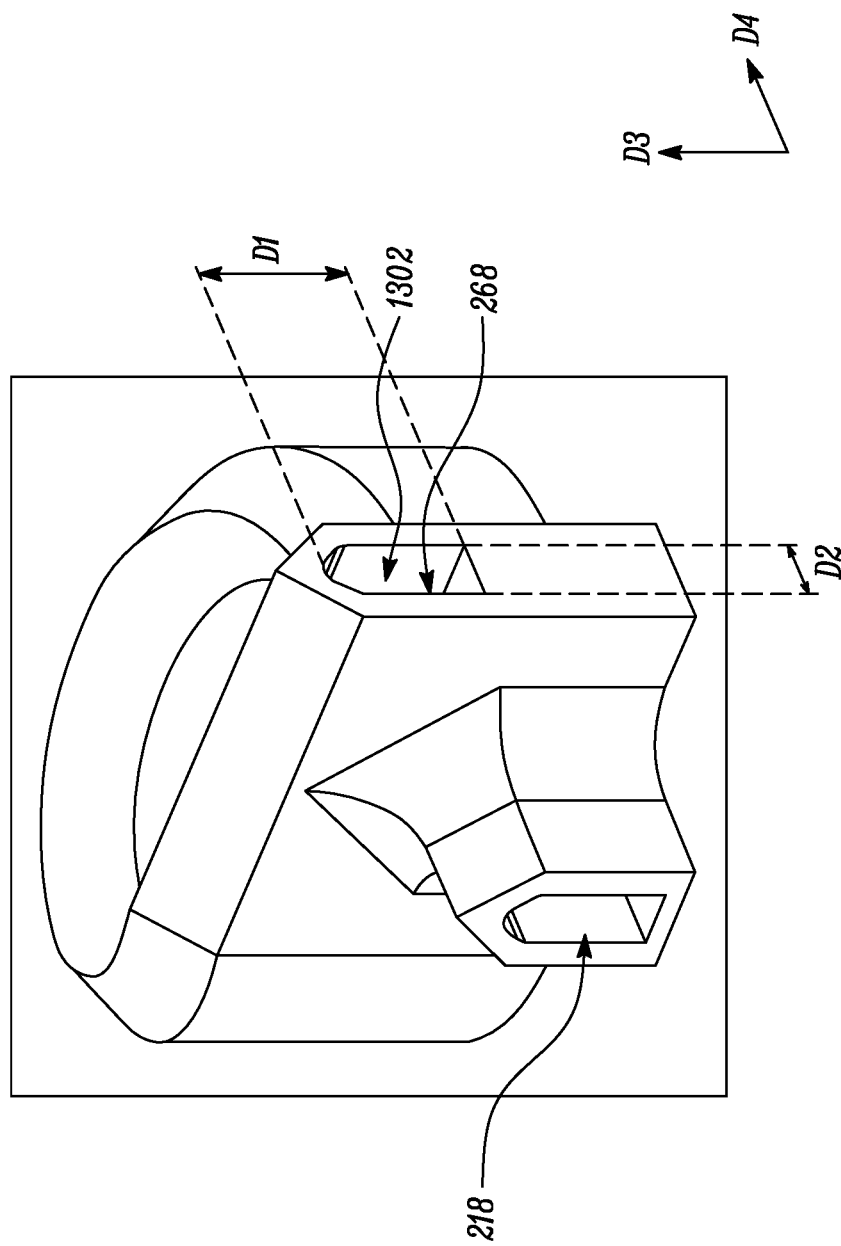
FIG. 13 is a perspective view illustrating an exemplary passage associated with the tube gallery of FIG. 3.

FIGS. 12 and 13 illustrate different types of passages 1202, 1204, 1206, 1302. The passage 1202, 1204, 1206, 1302 of at least one channel 218 from the plurality of channels 218 may be at least one of straight, curved, or spiral. The tube gallery 200 may include the passages 1202, 1204, 1206, 1302 having different designs to optimally arrange the channels 218 for purposes of weight reduction, reducing material usage, and accommodation of the tube gallery 200 in compact spaces.

FIG. 12 shows the tube gallery 200 having the passage 1202 embodied as a straight passage and the passages 1204 embodied as curved passages. It should be noted that the passages 1204 may be designed in such a way that the passages 1204 may eliminate any sharp bends, thereby preventing pressure losses. Further, the passage 1206 includes a combination of a straight portion and a curved portion.

FIG. 13 shows a perspective view of the passage 1302 embodied as a spiral passage. In the illustrated embodiment of FIG. 13, the passage 1302 includes a single loop. However, the passage 1302 may include more than one loop. The passage 1302 having such as spiral design may be accommodated in compact horizontal spaces. Further, the loop of the passage 1302 may be designed in such a way that the loop eliminates any sharp bends, thereby preventing pressure losses.

Figure 14:
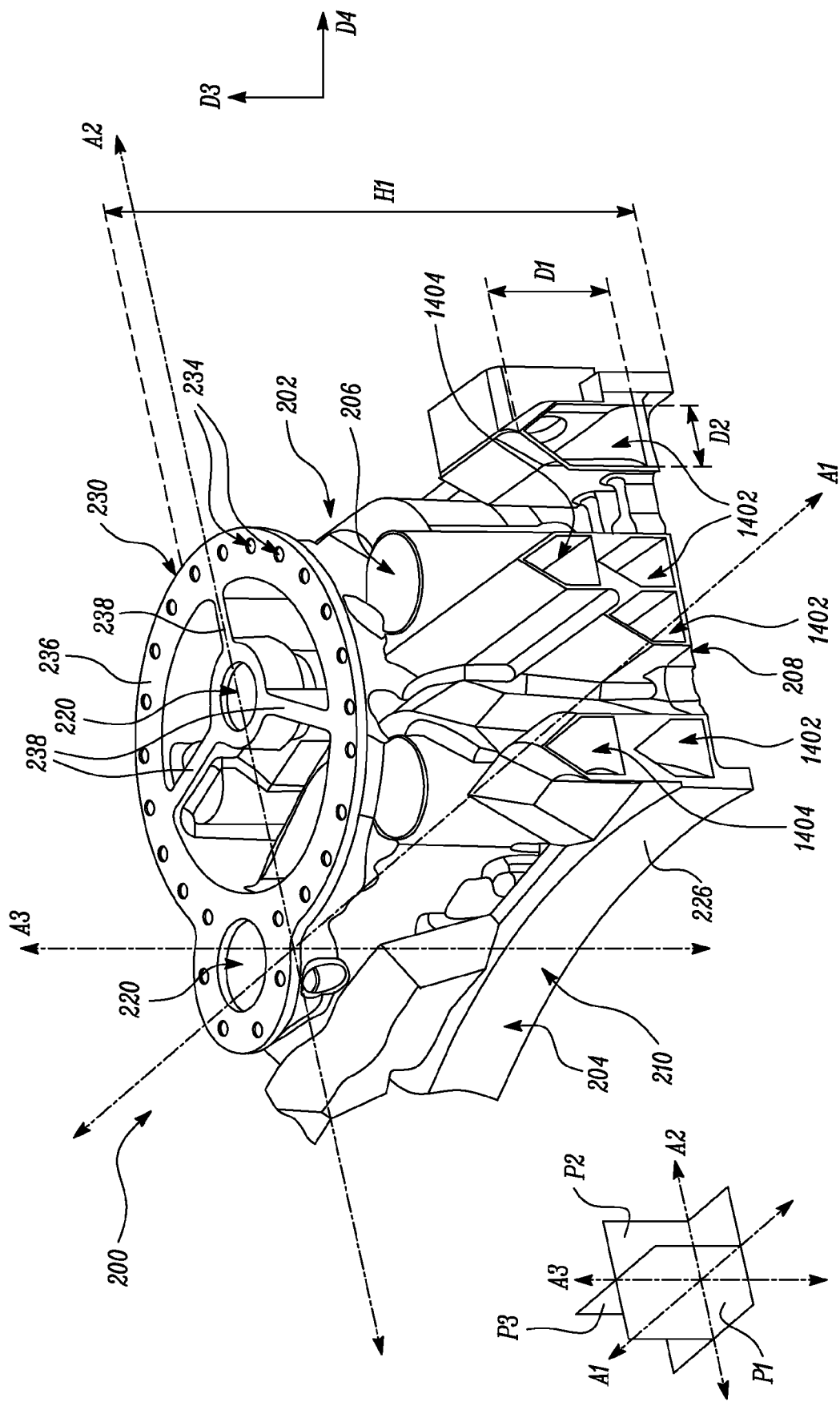
FIG. 14 is a cross-sectional view of the tube gallery of FIG. 3 along a second plane P2.

Referring now to FIG. 14, the passages 1402, 1404 of at least two adjacent channels 218 from the plurality of channels 218 may be spaced apart from each other along at least one of the first axis A1, the second axis A2, and the third axis A3. In the illustrated embodiment of FIG. 14, each of the passages 1402 are spaced apart from each other along the second axis A2. Further, the passages 1404 are spaced apart from the passages 1402 along the third axis A3. It should be further noted that some passages 1402, 1404 may also be spaced apart from each other along the first axis A1. Further, a distance between two adjacent passages 1402, 1404 may not be uniform along the first axis A1, the second axis A2, or the third axis A3. Alternatively, the distance between two adjacent passages 1402, 1404 may be uniform along the first axis A1, the second axis A2, or the third axis A3.

Further, at least a portion of the passage 1402, 1404 of at least one channel 218 from the plurality of channels 218 may be inclined obliquely relative to at least one of the first, second, and third planes P1, P2, P3. More particularly, disposition of the inlets 220 and/or the outlets 222 (see FIG. 6) on the upper surface 206, the lower surface 208, or the side surface 210 may require some of the passages 1402, 1404 to be disposed in an inclined manner. Further, the passages 1402, 1404 may also be inclined to accommodate various features of the body 202, such as the inlet and/or outlet boss 240, 248 (see FIGS. 3 and 6). In some examples, only some portions of the passage 1402, 1404 instead of the entire passage 1402, 1404 may be inclined obliquely relative to the first plane P1, the second plane P2, and/or the third plane P3. In some situations, when the inlet 220 and the outlet 222 are disposed in different planes P1, P2, P3, it may be contemplated that the entire passage 1402, 1404 is inclined obliquely relative to the first plane P1, the second plane P2, or the third plane P3.

Further, the passage 1402, 1404 of each channel 218 from the plurality of channels 218 has the non-circular cross-sectional shape 268 in one of the first, second, and third planes P1, P2, P3. As illustrated in FIG. 15A, the non-circular cross-sectional shape 268 includes a rectangular portion 272 and a triangular portion 270 disposed adjacent to the rectangular portion 272. Specifically, the triangular portion 270 extends vertically from the rectangular portion 272 along a first direction D3. Further, the non-circular cross-sectional shape 268 has a first maximum dimension D1 along the first direction D3 and a second maximum dimension D2 along a second direction D4 orthogonal to the first direction D3. In the illustrated embodiment of FIG. 15A, the first maximum dimension D1 is greater than the second maximum dimension D2 by a factor of at least 1.2. In various embodiments, the factor may correspond to at least 1.5, at least 2, at least 3, at least 4, at least 5, and the like, without any limitations. Further, the first maximum dimension D1 and the second maximum dimension D2 may correspond to a height and a width, respectively, of the non-circular cross-sectional shape 268.

It should be noted that the first and second maximum dimensions D1, D2 may vary for different passages 1402, 1404 (see FIG. 14). Further, the non-circular cross-sectional shape 268 may allow the passages 1402, 1404 to have a higher value of the first maximum dimension D1. Thus, it may be possible to reduce a value of the second maximum dimension D2 without reducing a cross-sectional area of the passages 1402, 1404 or an amount of fluid flow through the passages 1402, 1404. In such examples, it may be possible to group the passages 1402, 1404 proximate to each other and eliminate dead space between the passages 1402, 1404.

In various embodiments, the first maximum dimension D1 may approximately lie between 5 millimetres (mm) and 50 mm. Further, in various embodiments, the second maximum dimension D2 may approximately lie between 2 mm and 40 mm. In some embodiments, the non-circular cross-sectional shape 268 may include a high aspect ratio. Further, the first maximum dimension D1 and the second maximum dimension D2 of the passages 1402, 1404 may be different from each other or similar to each other, as per application requirements.

It should be noted that the first maximum dimension D1 of the passages 1402, 1404 may govern the height H1 (see FIG. 14) of the tube gallery 200. In some embodiments, the passage 1402, 1404 with a highest value of the first maximum dimension D1 may govern the height H1 of the tube gallery 200. In some instances, the first maximum dimension D1 of any one passage 1402, 1404 or a summation of the first maximum dimension D1 of multiple passages 1402, 1404 that are stacked above each other may be substantially similar to the height H1 of the tube gallery 200. Further, as the passages 1402, 1404 include the non-circular cross-sectional shape 268 having high aspect ratios, the passages 1402, 1404 may also act as stiffening structures to provide structural strength to the tube gallery 200.

FIGS. 15B to 15I illustrate schematic views of different exemplary non-circular cross-sectional shapes 1502, 1504, 1506, 1508, 1510, 1512, 1514, 1516 that may be associated with the passages 224, 1402, 1404 (see FIGS. 4 and 14) of the tube gallery 200 (see FIGS. 3 and 14). Each non-circular cross-sectional shape 1502, 1504, 1506, 1508, 1510, 1512, 1514, 1516 defines the first maximum dimension D1 and the second maximum dimension D2.

As illustrated in FIG. 15B, the non-circular cross-sectional shape 1502 is a teardrop shape. The non-circular cross-sectional shape 1502 may include a taper angle T1 that is less than 30 degrees. In some embodiments, when the taper angle T1 is 20 degrees, weight reduction of the tube gallery 200 may be maximized.

FIG. 15C illustrates another exemplary non-circular cross-sectional shape 1504 embodied as a teardrop shape. In this embodiment, the non-circular cross-sectional shape 1504 includes a taper angle T2 of 30 degrees. FIG. 15D illustrates yet another exemplary non-circular cross-sectional shape 1506 embodied as a teardrop shape. The non-circular cross-sectional shape 1506 of this embodiment includes an elongated teardrop profile.

FIGS. 15E, 15F, 15G illustrate various exemplary non-circular cross-sectional shapes 1508, 1510, 1512. The non-circular cross-sectional shape 1508, 1510, 1512 is at least one of rectangular, triangular, and square. As illustrated in FIG. 15E, the non-circular cross-sectional shape 1508 includes a rectangular shape. As illustrated in FIG. 15F, the non-circular cross-sectional shape 1510 includes a triangular shape. As illustrated in FIG. 15G, the non-circular cross-sectional shape 1512 includes a square shape.

FIG. 15H illustrates another exemplary non-circular cross-sectional shape 1514. In this embodiment, the non-circular cross-sectional shape 1514 includes an elongated hexagonal shape. FIG. 15I illustrates yet another exemplary non-circular cross-sectional shape 1516. In this embodiment, the non-circular cross-sectional shape 1516 includes an arrow shaped profile.

It should be noted that the non-circular cross-sectional shapes 268, 1502, 1504, 1506, 1508, 1510, 1512, 1514, 1516 may include any other shape having a high aspect ratio. In other embodiments, the non-circular cross-sectional shape 268, 1502, 1504, 1506, 1508, 1510, 1512, 1514, 1516 may include any other shape such as a trapezoidal shape, a pentagonal shape, an oval shape, a rhombus shape, and the like, without any limitations. It should be noted that the non-circular cross-sectional shapes 268, 1502, 1504, 1506, 1508, 1510, 1512, 1514, 1516 are applicable to all passages 224, 1202, 1204, 1206, 1302, 1402, 1404 (see FIGS. 4, 12, 13, 14) associated with the tube gallery 200 such as the passages 224, 1202, 1204, 1206, 1302, without any limitations.

Further, the passages 224, 1202, 1204, 1206, 1302, 1402, 1404 of at least two channels 218 from the plurality of channels 218 may have different non-circular cross-sectional shapes 268, 1502, 1504, 1506, 1508, 1510, 1512, 1514, 1516. For example, some passages 224, 1202, 1204, 1206, 1302, 1402, 1404 may have the non-circular cross-sectional shape 268 as illustrated in FIG. 15A, and some passages 224, 1202, 1204, 1206, 1302, 1402, 1404 may have the non-circular cross-sectional shapes 1502, 1504, 1506, 1508, 1510, 1512, 1514, 1516 as illustrated in FIGS. 15B to 15I. In other embodiments, all the passages 224, 1202, 1204, 1206, 1302, 1402, 1404 may have the same non-circular cross-sectional shape 268, 1502, 1504, 1506, 1508, 1510, 1512, 1514, 1516.

Figure 16A:
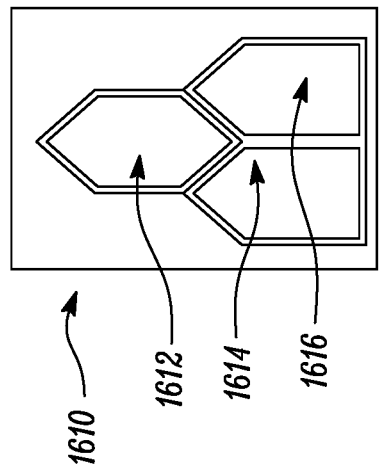
FIGS. 16A to 16D illustrate different stacking arrangements for the passages associated with the tube gallery of FIG. 3.

FIGS. 16A to 16D illustrate different stacking arrangements 1602, 1610, 1618, 1628. FIG. 16A shows the exemplary first stacking arrangement 1602 of passages 1604, 1606, 1608. In the first stacking arrangement 1602, the passages 1604, 1606, 1608 have the non-circular cross-sectional shape 268 as described with reference to FIG. 15A. Further, the passages 1606, 1608 are arranged besides each other.

Moreover, the passage 1602 is stacked above the passage 1604.

Figure 16B:
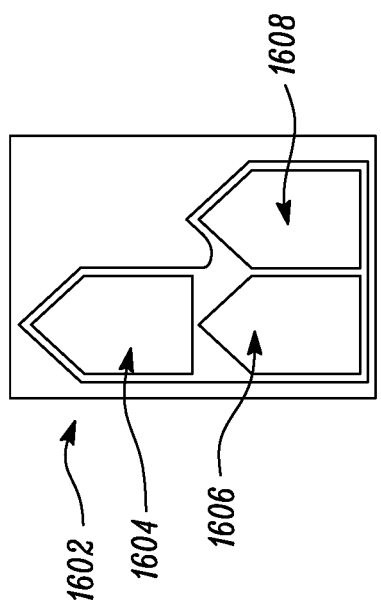

FIG. 16B shows the exemplary second stacking arrangement 1610 of passages 1612, 1614, 1616. In the second stacking arrangement 286, the passage 1612 has the non-circular cross-sectional shape 1514 as described with reference to FIG. 15H and the passages 1614, 1616 have the non-circular cross-sectional shape 268 as described with reference to FIG. 15A. Further, the second stacking arrangement 1610 is embodied as a honeycomb stacking arrangement. The passages 1614, 1616 are arranged besides each other. Moreover, the passage 1612 is stacked above the passages 1614, 1616. The second stacking arrangement 1610 may provide a compact stacking arrangement as multiple passages 1612, 1614, 1616 can be arranged in a compact space.

Figure 16C:
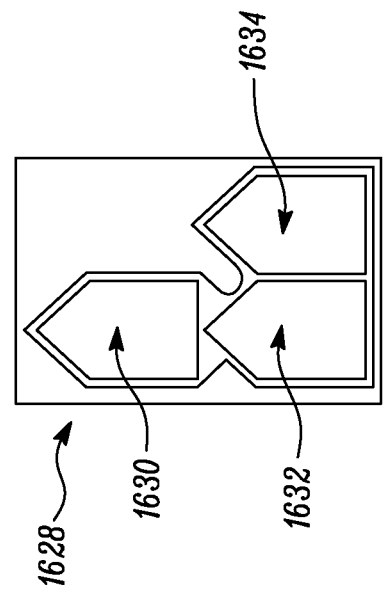

FIG. 16C shows the exemplary third stacking arrangement 1618 of passages 1620, 1622, 1624, 1626. In the third stacking arrangement 1618, the passages 1620, 1622 have the non-circular cross-sectional shape 1516 as described with reference to FIG. 15I whereas the passages 1624, 1626 have the non-circular cross-sectional shape 268 as described with reference to FIG. 15A. Further, the passages 1624, 1626 are arranged besides each other. Moreover, the passages 1620, 1622 are stacked above the passages 1624, 1626, respectively.

Figure 16D:
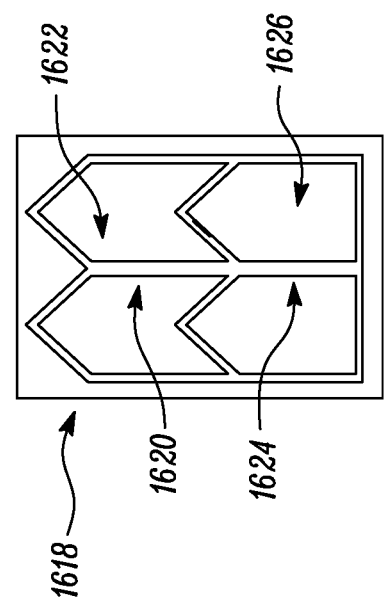

FIG. 16D shows the exemplary fourth stacking arrangement 1628 of passages 1630, 1632, 1634. In the fourth stacking arrangement 1628, the passages 1630, 1632, 1634 have the non-circular cross-sectional shape 268 as described with reference to FIG. 15A. Further, the passages 1632, 1634 are arranged besides each other. Moreover, the passage 1630 is stacked above the passage 1632. The fourth stacking arrangement 1628 is similar to the first stacking arrangement 1602, however, in the fourth stacking arrangement 1628, a portion adjacent to the passage 1630 is reprofiled to remove excess material to further reduce the weight of the tube gallery 200.

The stacking arrangements 1602, 1610, 1618, 1628 described herein are exemplary in nature and the tube gallery 200 (see FIG. 3) may include any other stacking arrangement, without any limitations. Further, the tube gallery 200 may include a combination of different types of stacking arrangements, such as a combination of one or more of the stacking arrangements 1602, 1610, 1618, 1628.

Figure 17:
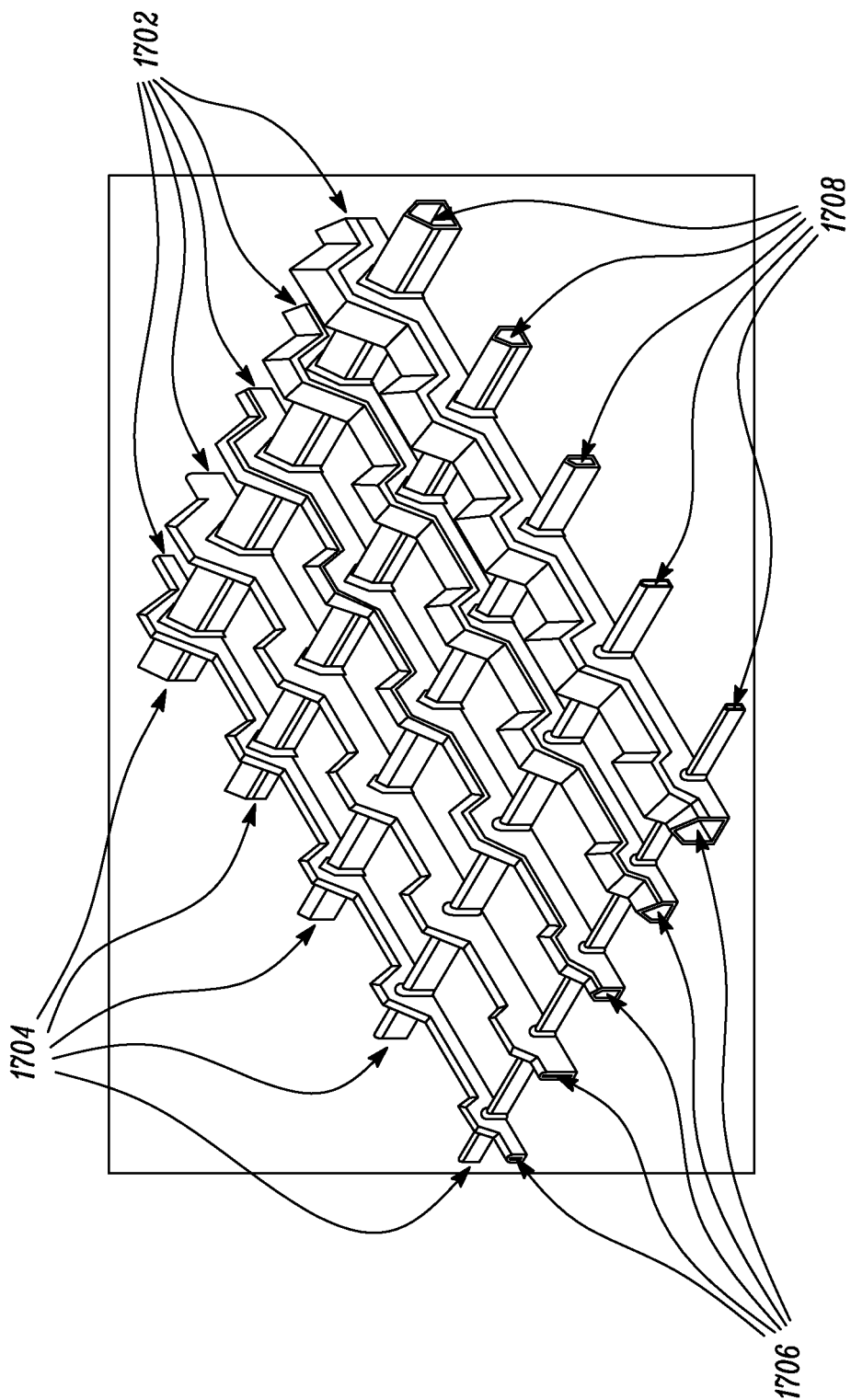
FIG. 17 is a schematic perspective view illustrating a number of channels associated with the tube gallery of FIG. 3.

Referring to FIG. 17, the tube gallery 200 includes a plurality of channels 1702 and a plurality of channels 1704. Each channel 1702 includes a passage 1706 and each second channel 1704 includes a passage 1708. Further, the passage 1706 of at least one channel 1702 from the plurality of channels 1702 is at least partially curved around the passage 1708 of another channel 1704 from the plurality of channels 1704. As illustrated in FIG. 17, the passage 1708 of each channel 1704 is embodied as a straight passage. Further, the passage 1706 of the channels 1702 are curved around the passages 1708 of the channels 1704. Moreover, in the illustrated embodiment of FIG. 17, the passages 1706 of the channels 1702 have different dimensions. Alternatively, the passages 1706 of the channels 1702 may have same dimensions.

Figure 18:
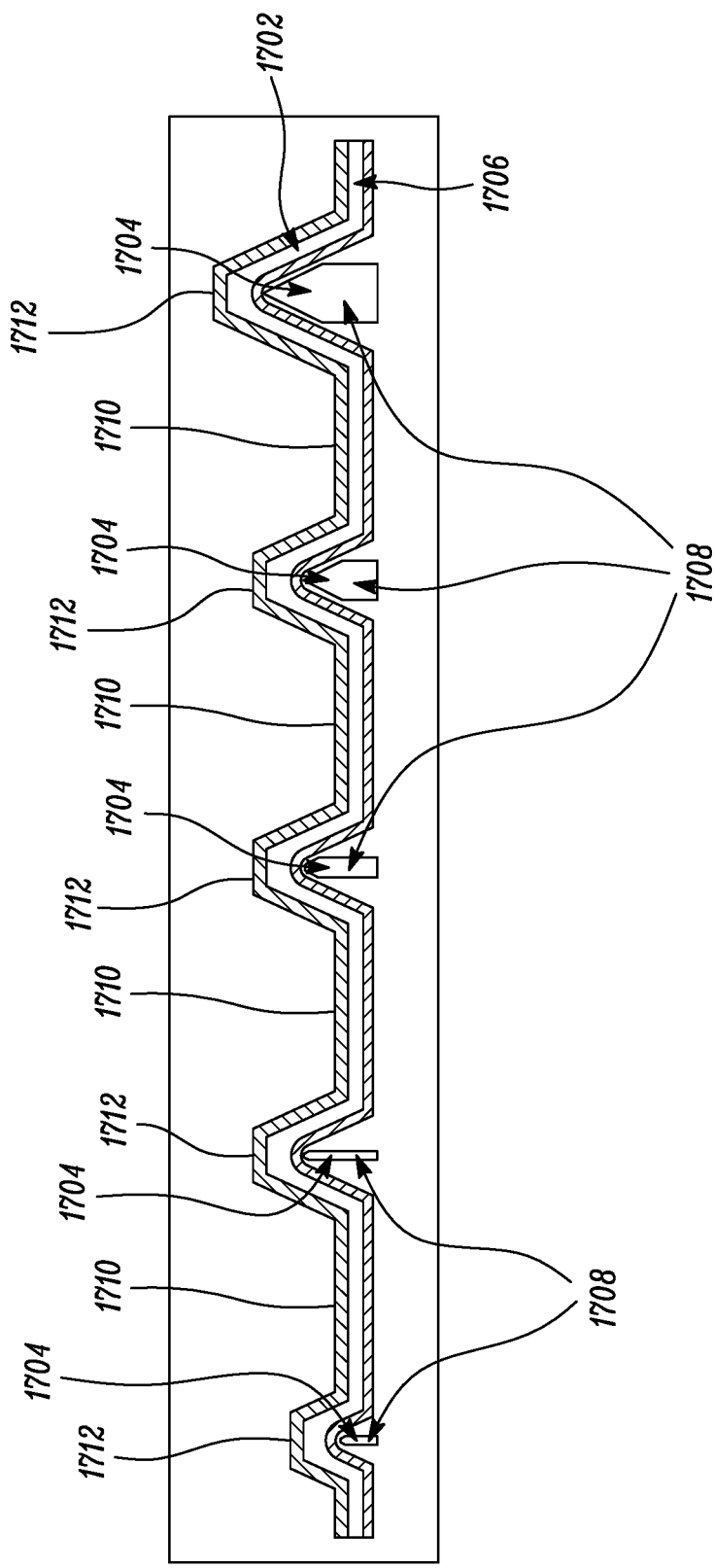
FIG. 18 is a cross-sectional view of the channels of FIG. 17.

As shown in FIG. 18, the passages 1706 of the set of channels 1702 may have a number of straight portions 1710 and a number of raised portions 1712. The raised portions 1712 are provided to allow routing of the passages 1706 of the channels 1702 over the passages 1708 of the channels 1704. Further, the passages 1708 of the channels 1704 may have different dimensions. Alternatively, the passages 1708 of the channels 1704 may have same dimensions.

In various embodiments, the passages 1706, 1708 may also curve around various features defined in the body 202 (see FIG. 3). For example, the passages 1706, 1708 may curve around various apertures, such as the first apertures 244 (see FIG. 8) of the inlet boss 240 (see FIG. 8), the second apertures 252 (see FIG. 6) of the outlet boss 248 (see FIG. 6), and the like.

Figure 19:
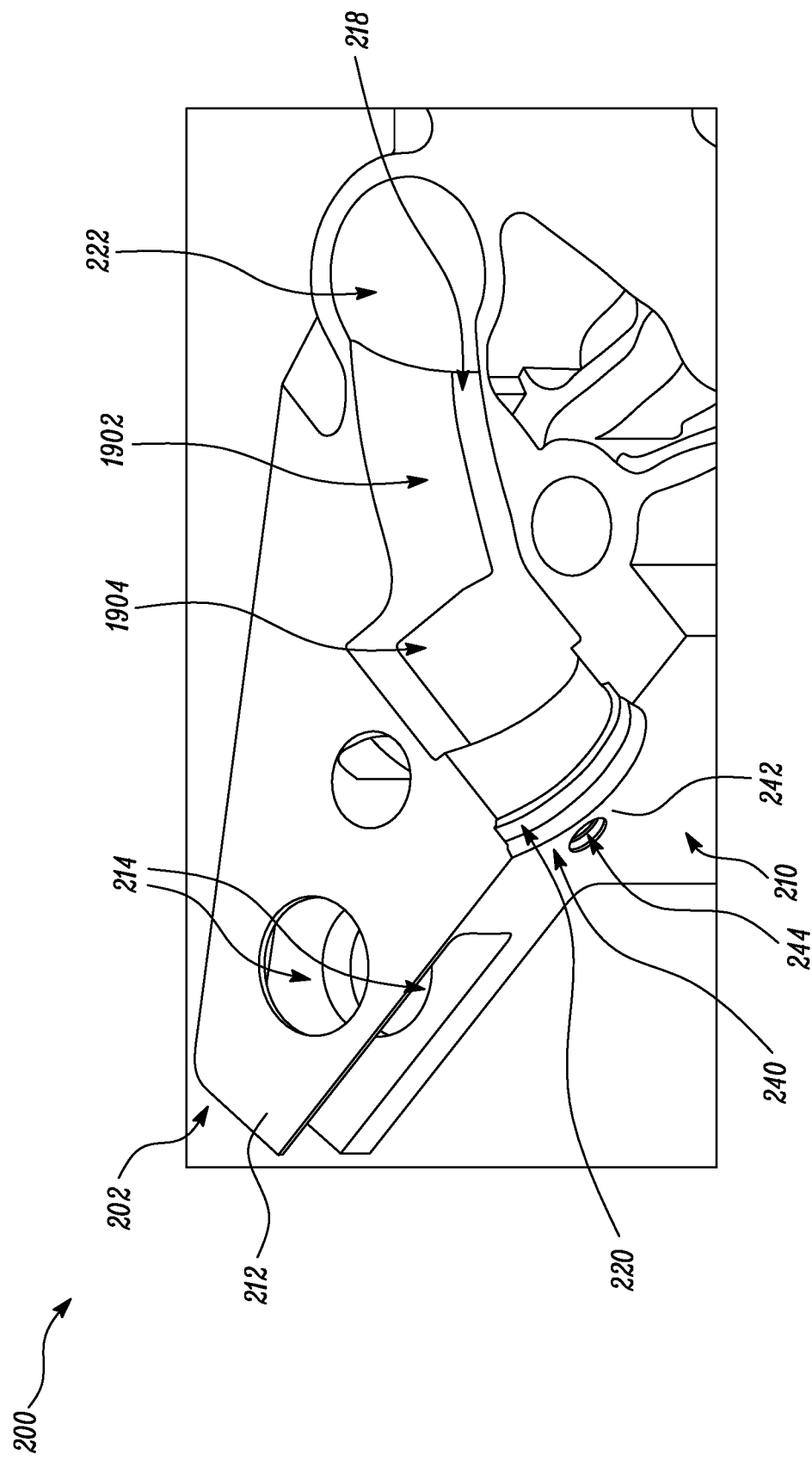
FIG. 19 illustrates a perspective view of a transfer reservoir associated with the tube gallery of FIG. 3.

Referring to FIG. 19, the channels 218 may further include one or more transfer reservoirs 1904. As illustrated in FIG. 19, the transfer reservoir 1904 is in fluid communication with a passage 1902 of the channel 218. In some examples, the transfer reservoir 1904 may be provided in the body 202 due to space restrictions presented by the inlet and/or outlet boss 240, 248 (see FIG. 6), or when the inlet 220 and the outlet 222 are proximate to each other. In the illustrated embodiment of FIG. 19, the inlet 220 of the channel 218 is disposed on the side surface 210 whereas the outlet 222 of the channel 218 is disposed on the lower surface 208 (see FIG. 6) and is proximate to the inlet 220. In such examples, due to space restrictions as well as dimensional and orientation mismatches between the inlet 220, the passage 1902, and/or the outlet 222, the transfer reservoir 1904 may be defined in the tube gallery 200.

Figure 20:
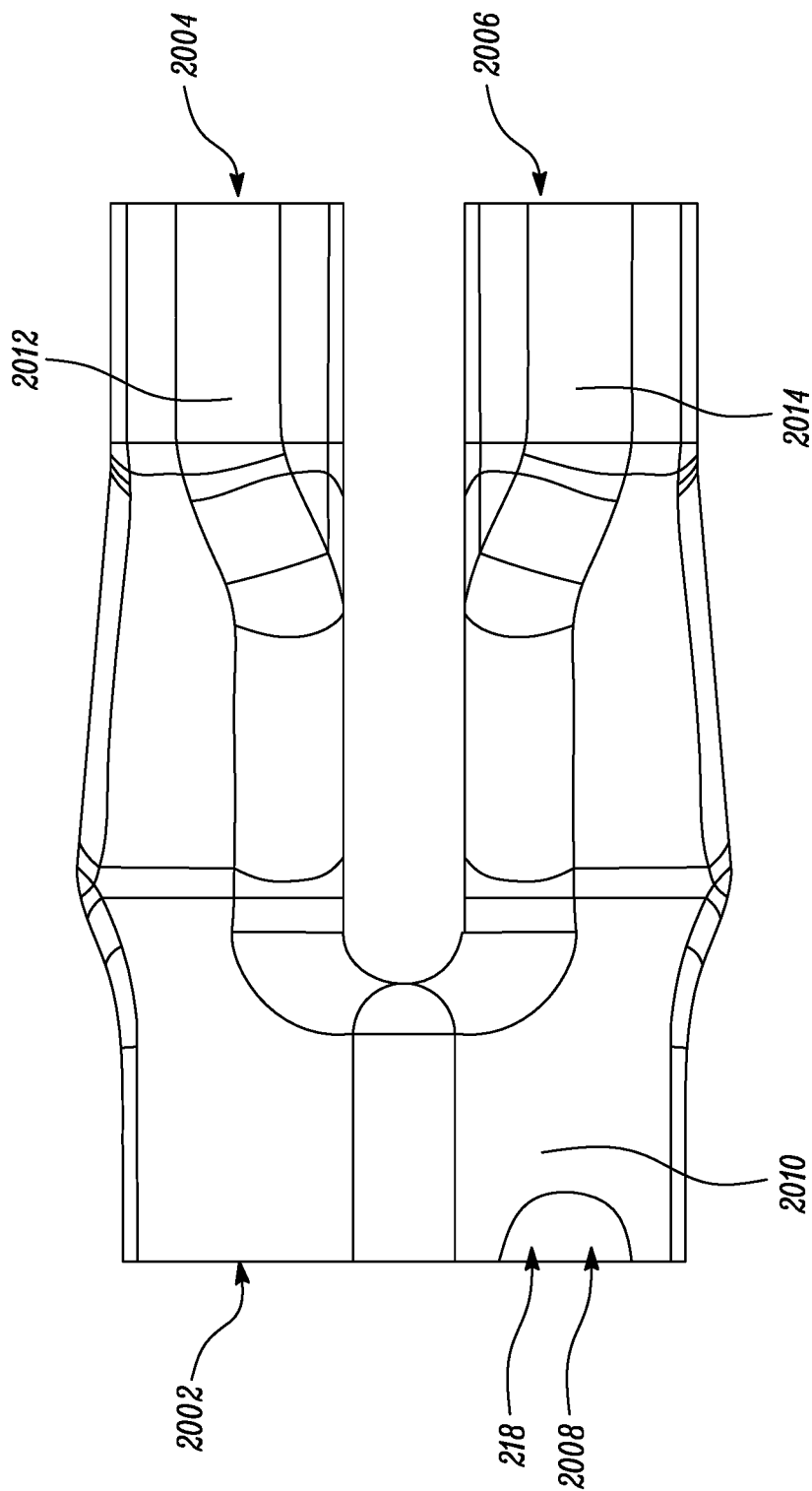
FIGS. 20 and 21 are schematic top and side views, respectively, illustrating exemplary arrangement of passages having multiple outlets.

Further, referring to FIG. 20, in some embodiments, one or more channels 218 may include a single inlet 2002 and multiple outlets 2004, 2006. FIG. 20 illustrates the multiple outlets 2004, 2006 disposed in a parallel arrangement. In the illustrated embodiment of FIG. 20, at least one channel 218 from the plurality of channels 218 includes the plurality of outlets 2004, 2006. Further, a passage 2008 of the at least one channel 218 includes a common portion 2010 fluidly communicating with the inlet 2002 and a plurality of branched portions 2012, 2014 branching from the common portion 2010 and fluidly communicating with a corresponding outlet 2004, 2006 from the plurality of outlets 2004, 2006. The common portion 2010 is defined proximate the inlet 2002. The channel 218 illustrated in FIG. 20 includes two outlets 2004, 2006 and two branched portions 2012, 2014. The branched portion 2012 is in fluid communication with the common portion 2010 at one end and the outlet 2004 at another end. Further, the branched portion 2014 is in fluid communication with the common portion 2010 at one end and the outlet 2006 at another end. Although the channel 218 includes two outlets 2004, 2006 and two branched portions 2012, 2014, it should be noted that the channel 218 may include any number of outlets and branched portions, as per application requirements.

Figure 21:
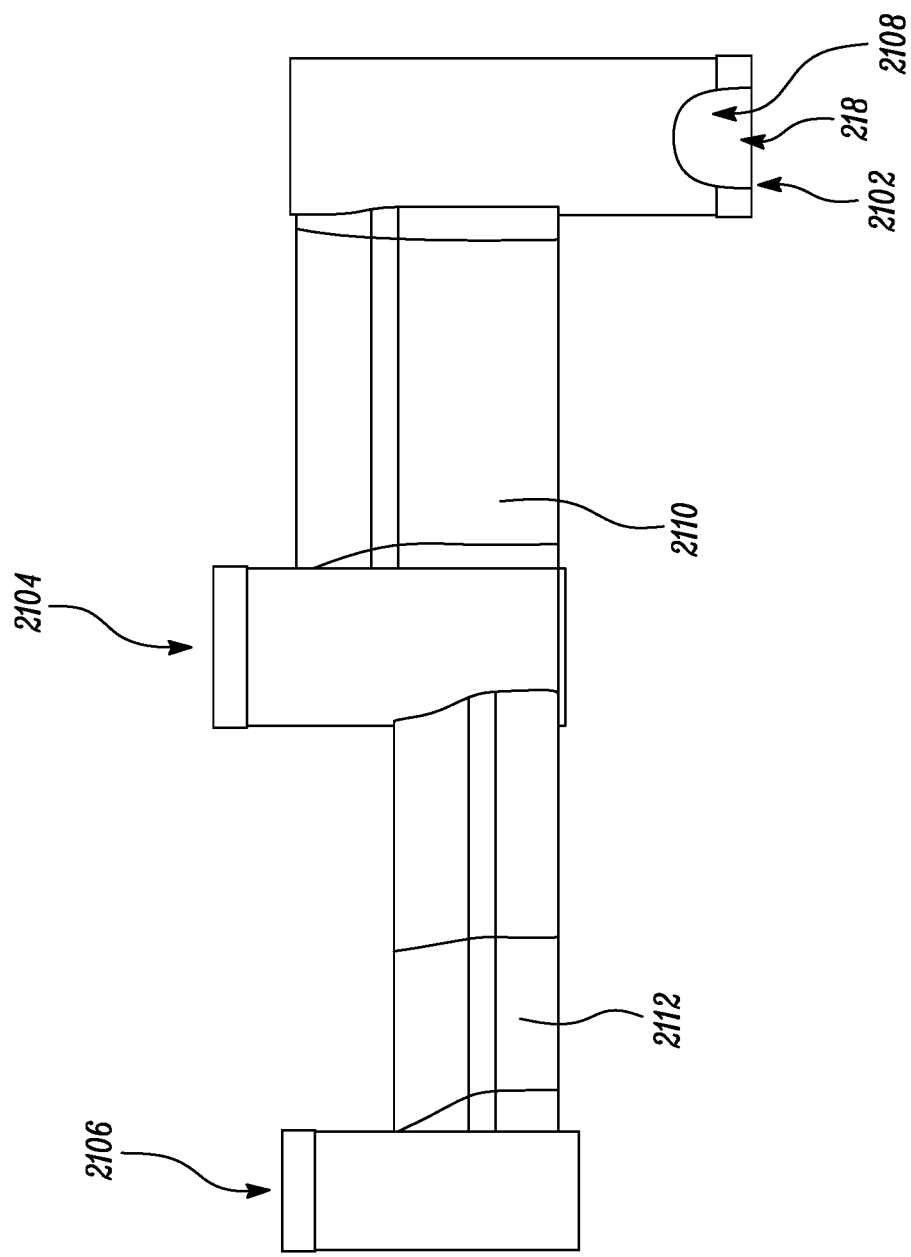

FIG. 21 illustrates another exemplary arrangement wherein one or more channels 218 may include a single inlet 2102 and multiple outlets 2104, 2106. In the embodiment of FIG. 21, a passage 2108 of the channel 218 includes a common portion 2110 fluidly communicating with the inlet 2102 and a single branched portion 2112 that is in fluid communication with the common portion 2110. Further, the common portion 2110 is defined proximate the inlet 2102. The channel 218 illustrated in FIG. 21 includes two outlets 2104, 2106. Specifically, the channel 218 includes the outlet 2104 that is in direct fluid communication with the common portion 2110 whereas the outlet 2106 that is in fluid communication with the common portion 2110 via the branched portion 2112. Although the channel 218 includes two outlets 2104, 2106 and the single branched portion 2112, it should be noted that the channel 218 may include any number of outlets and branched portions, as per application requirements.

Referring to FIGS. 20 and 21, the channel 218 may include more than one inlet 2002, 2102. In another embodiment, the channel 218 may include more than one inlet 2002, 2102 and more than two outlets 2004, 2006, 2104, 2106. It should be noted that the number of inlets 2002, 2102, the number of outlets 2004, 2006, 2104, 2106, and the arrangement of the inlets 2002, 2102, and the outlets 2004, 2006, 2104, 2106 do not limit the scope of the present disclosure.

Figure 22A:
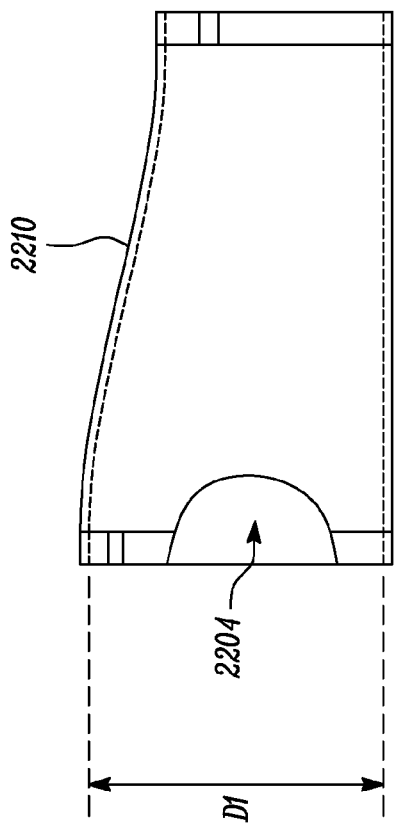
FIGS. 22A to 22C are schematic side views of various exemplary passages including transition zones.
Figure 22B:
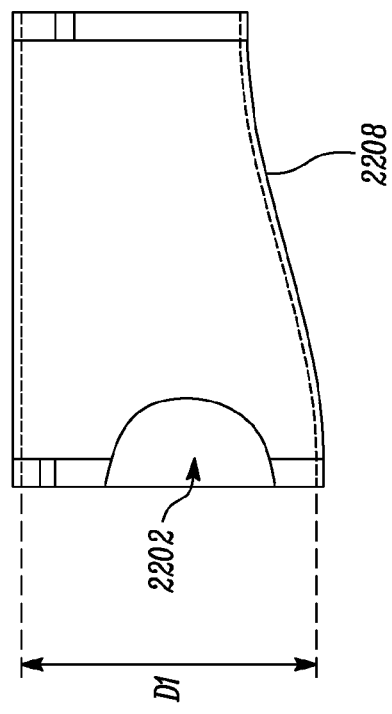
Figure 22C:
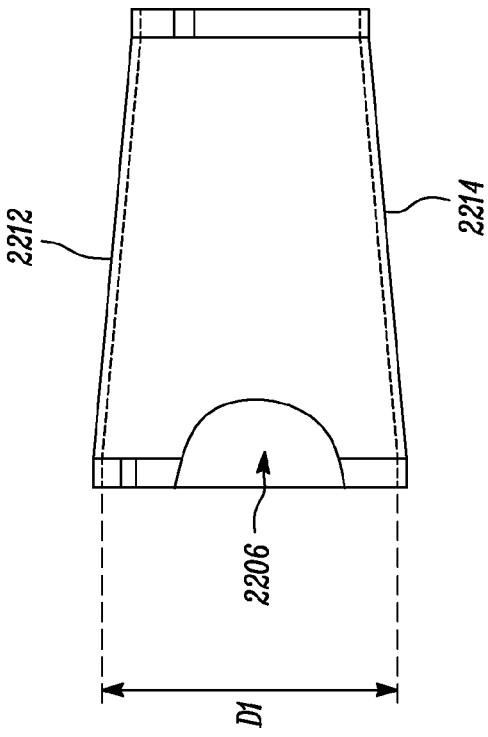

Referring now to FIGS. 22A, 22B, and 22C, one or more passages 2202, 2204, 2206 of the tube gallery 200 may include a transition zone that allows variation in a first maximum dimension D1 of the passages 2202, 2204, 2206. Specifically, the transition zones may allow variation in the first maximum dimension D1 for accommodation of sealing features, the bolted-on units, or the fittings 1102, 1104, 1106, 1108, 1110, 1114 (see FIGS. 11A to 11F). Further, such transition zones may eliminate a requirement of increasing the height H1 (see FIG. 3) of the tube gallery 200 for accommodating the sealing features or the fittings 1102, 1104, 1106, 1108, 1110, 1114. In other examples, the transition zones may additionally, or alternatively, allow variation in a second maximum dimension (not shown) of the passages 2202, 2204, 2206 for accommodation of the sealing features, the bolted-on units, or the fittings 1102, 1104, 1106, 1108, 1110, 1114.

FIGS. 22A, 22B, and 22C illustrate schematic views for the passages 2202, 2204, 2206 having the transition zones. As illustrated in FIG. 22A, the first maximum dimension D1 of the passage 2202 is reduced based on provision of an angled lower wall 2208. As illustrated in FIG. 22B, the first maximum dimension D1 of the passage 2204 is reduced based on provision of an angled upper wall 2210. As illustrated in FIG. 22C, the first maximum dimension of the passage 2206 is reduced based on provision of an angled upper wall 2212 as well as an angled lower wall 2214.

Conventional tube galleries associated with gas turbine engines may be manufactured by drilling one or more holes in a plate of the tube gallery to create one or more passages for allowing fluid transfer between a number of components of such gas turbine engines. Such tube galleries typically include straight passages having a circular cross section. Conventional tube galleries do not allow variation in space between adjacent passages for saving material and reducing weight of the tube galleries. In conventional methods of manufacturing the tube gallery, the drilling operation is performed through side surfaces of the tube gallery. However, the drilling operation through the side surface of the tube gallery may create a number of fluid stagnation zones that may cause undesirable fluid accumulation within the passages. The fluid stagnation zones may require blanking as they may not be functionally required. Conventional tube galleries of the gas turbine engine may also exhibit high pressure losses due to a geometry of the passages. Specifically, pressure losses may occur at sharp bends where the drilled passages intersect each other. Further, conventional tube galleries associated with gas turbine engines typically tend to be heavy as the passages of the tube gallery may not be optimally arranged and may not allow a flexibility for material removal from the plate of the tube gallery.

The present disclosure provides the tube gallery 200 for use with the gas turbine engine 10. The passages 224, 1202, 1204, 1206, 1302, 1402, 1404, 1604, 1606, 1608, 1612, 1614, 1616, 1620, 1622, 1624, 1626, 1630, 1632, 1634, 1706, 1708, 1902, 2008, 2108, 2202, 2204, 2206 of the tube gallery 200 are arranged in a manner that may allow removal of material from the tube gallery 200, thereby providing the tube gallery 200 that is lighter in weight than conventional tube galleries. For example, the passages 224, 1202, 1204, 1206, 1302, 1402, 1404, 1604, 1606, 1608, 1612, 1614, 1616, 1620, 1622, 1624, 1626, 1630, 1632, 1634, 1706, 1708, 1902, 2008, 2108, 2202, 2204, 2206 may be arranged proximate to each other which may facilitate removal of excess material from the body 202, thereby reducing the weight of the tube gallery 200.

Further, the passages 224, 1202, 1204, 1206, 1302, 1402, 1404, 1604, 1606, 1608, 1612, 1614, 1616, 1620, 1622, 1624, 1626, 1630, 1632, 1634, 1706, 1708, 1902, 2008, 2108, 2202, 2204, 2206 may include any non-circular cross-sectional shape 268, 1502, 1504, 1506, 1508, 1510, 1512, 1514, 1516. In various embodiments, the non-circular cross-sectional shapes 268, 1502, 1504, 1506, 1508, 1510, 1512, 1514, 1516 of the passages 224, 1202, 1204, 1206, 1302, 1402, 1404, 1604, 1606, 1608, 1612, 1614, 1616, 1620, 1622, 1624, 1626, 1630, 1632, 1634, 1706, 1708, 1902, 2008, 2108, 2202, 2204, 2206 may be chosen based on space constraints, overall dimensions of the tube gallery 200, a total number of the passages 224, 1202, 1204, 1206, 1302, 1402, 1404, 1604, 1606, 1608, 1612, 1614, 1616, 1620, 1622, 1624, 1626, 1630, 1632, 1634, 1706, 1708, 1902, 2008, 2108, 2202, 2204, 2206, and the like. Further, the non-circular cross-sectional shapes 268, 1502, 1504, 1506, 1508, 1510, 1512, 1514, 1516 may be selected such that the tube gallery 200 may exhibit increased structural efficiency and rigidity. Furthermore, pressure losses in the tube gallery 200 may be minimized as the passages 224, 1202, 1204, 1206, 1302, 1402, 1404, 1604, 1606, 1608, 1612, 1614, 1616, 1620, 1622, 1624, 1626, 1630, 1632, 1634, 1706, 1708, 1902, 2008, 2108, 2202, 2204, 2206 of the tube gallery 200 do not include any sharp bends.

Moreover, the tube gallery 200 may be manufactured using additive layer manufacturing techniques such as three-dimensional printing, or other manufacturing techniques such as moulding or casting. Using these techniques, it may be possible to define the passages 224, 1202, 1204, 1206, 1302, 1402, 1404, 1604, 1606, 1608, 1612, 1614, 1616, 1620, 1622, 1624, 1626, 1630, 1632, 1634, 1706, 1708, 1902, 2008, 2108, 2202, 2204, 2206 having any non-circular cross-sectional shape (such as the non-circular cross-sectional shapes 268, 1502, 1504, 1506, 1508, 1510, 1512, 1514, 1516). Further, such manufacturing techniques may allow arrangement of the passages 224, 1202, 1204, 1206, 1302, 1402, 1404, 1604, 1606, 1608, 1612, 1614, 1616, 1620, 1622, 1624, 1626, 1630, 1632, 1634, 1706, 1708, 1902, 2008, 2108, 2202, 2204, 2206 proximate to each other. Moreover, such manufacturing techniques may also allow provision of the passages 224, 1202, 1204, 1206, 1302, 1402, 1404, 1604, 1606, 1608, 1612, 1614, 1616, 1620, 1622, 1624, 1626, 1630, 1632, 1634, 1706, 1708, 1902, 2008, 2108, 2202, 2204, 2206 directly between the inlets 220, 2002, 2102 and the outlets 222, 2004, 2006, 2104, 2106, thereby eliminating the fluid stagnation zones. Additionally, the teachings of the present disclosure may be applied to tube galleries that may be associated with structural brackets/rafts, or accessory gearbox casings/covers. Further, the tube gallery 200 may be built into engine casings for optimising fluid packaging.

It will be understood that the embodiments are not limited to the embodiments described above and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A tube gallery for a gas turbine engine, the tube gallery comprising:
   a body formed as a single integral component, the body defining mutually orthogonal first, second, and third axes, the first and second axes, defining a first plane, the second and third axes, defining a second plane orthogonal to the first plane, and the first and third axes, defining a third plane orthogonal to each of the first and second planes, the body comprising:
   an external surface comprising an upper surface, a lower surface opposite to the upper surface, a side surface extending between the upper surface and the lower surface, wherein the upper surface and the lower surface substantially extend along the first and second axes, and wherein the side surface substantially extends along the third axis; and
   a plurality of channels defined in the body, each channel comprising an inlet disposed on the external surface, an outlet spaced apart from the inlet and disposed on the external surface, and a passage extending between and fluidly communicating the inlet to the outlet, wherein the inlets of the plurality of channels are spaced apart from each other, wherein the outlets of the plurality of channels are spaced apart from each other, wherein the passage from the plurality of channels has a non-circular cross-sectional shape in one of the first, second, and third planes, wherein the non-circular cross-sectional shape has a first maximum dimension along a first direction and a second maximum dimension along a second direction orthogonal to the first direction, and wherein the first maximum dimension is greater than the second maximum dimension by a factor of at least 1.2.

2. The tube gallery of claim 1, wherein at least one of the inlet and the outlet of at least one channel from the plurality of channels is disposed on the upper surface.

3. The tube gallery of claim 1, wherein at least one of the inlet and the outlet of at least one channel from the plurality of channels is disposed on the lower surface.

4. The tube gallery of claim 1, wherein at least one of the inlet and the outlet of at least one channel from the plurality of channels is disposed on the side surface.

5. The tube gallery of claim 1, wherein the inlet of at least one channel from the plurality of channels has a circular cross-sectional shape or a non-circular cross-sectional shape.

6. The tube gallery of claim 1, wherein the outlet of at least one channel from the plurality of channels has a circular cross-sectional shape or a non-circular cross-sectional shape.

7. The tube gallery of claim 1, wherein at least one channel from the plurality of channels comprises an inlet boss comprising the inlet extending to the passage, wherein the inlet boss is inclined to or parallel to the passage of the at least one channel.

8. The tube gallery of claim 1, wherein at least one channel from the plurality of channels comprises an outlet boss comprising the outlet extending to the passage, wherein the outlet boss is inclined to or parallel to the passage of the at least one channel.

9. The tube gallery of claim 1, wherein the passage of at least one channel from the plurality of channels is at least one of straight, curved, or spiral.

10. The tube gallery of claim 1, wherein at least one channel from the plurality of channels comprises a plurality of outlets, and wherein the passage of the at least one channel comprises a common portion fluidly communicating with the inlet and a plurality of branched portions branching from the common portion and fluidly communicating with a corresponding outlet from the plurality of outlets.

11. The tube gallery of claim 1, wherein the non-circular cross-sectional shape is at least one of rectangular, triangular, or square.

12. The tube gallery of claim 1, wherein the non-circular cross-sectional shape is a teardrop shape.

13. The tube gallery of claim 1, wherein the non-circular cross-sectional shape comprises a rectangular portion and a triangular portion disposed adjacent to the rectangular portion.

14. The tube gallery of claim 1, wherein the body further comprises an inlet flange disposed around the inlet of at least one channel from the plurality of channels, wherein the inlet flange defines a plurality of apertures extending at least partially therethrough.

15. The tube gallery of claim 1, wherein the body comprises one or more ribs extending from the inlet to the inlet flange.

16. The tube gallery of claim 1, wherein the body comprises a stiffening member disposed at least partially around a perimeter of the body, and wherein the stiffening member extends substantially along the third axis.

17. The tube gallery of claim 1, wherein the passages of at least two adjacent channels from the plurality of channels are spaced apart from each other along at least one of the first axis, the second axis, and the third axis.

18. The tube gallery of claim 1, wherein the passage of at least one channel from the plurality of channels is at least partially curved around the passage of another channel from the plurality of channels.

19. The tube gallery of claim 1, wherein the passages of at least two channels from the plurality of channels have different non-circular cross-sectional shapes.

20. The tube gallery of claim 1, wherein at least a portion of the passage of at least one channel from the plurality of channels is inclined obliquely relative to at least one of the first, second, and third planes.

* * * * *